United States Patent
Miyake et al.

(10) Patent No.: US 6,954,542 B2
(45) Date of Patent: Oct. 11, 2005

(54) IMAGE PROCESSING APPARATUS AND METHOD

(75) Inventors: Nobutaka Miyake, Kanagawa-ken (JP); Minoru Kusakabe, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/754,524

(22) Filed: Jan. 12, 2004

(65) Prior Publication Data

US 2004/0141632 A1 Jul. 22, 2004

Related U.S. Application Data

(63) Continuation of application No. 09/537,688, filed on Mar. 29, 2000, now abandoned.

(30) Foreign Application Priority Data

Mar. 30, 1999 (JP) .......................................... 11-090072
Mar. 30, 1999 (JP) .......................................... 11-090073

(51) Int. Cl.$^7$ ................................................. G06K 9/00
(52) U.S. Cl. ........................ 382/100; 380/287; 713/176; 348/460
(58) Field of Search ................................ 382/100, 232; 380/54, 210; 713/176; 704/200.1, 273; 381/73.1; 348/460, 463

(56) References Cited

U.S. PATENT DOCUMENTS

| | | | | |
|---|---|---|---|---|
| 4,776,013 A | * | 10/1988 | Kafri et al. ................... 380/54 |
| 5,721,788 A | * | 2/1998 | Powell et al. ................ 382/100 |
| 5,822,462 A | | 10/1998 | Miyake ...................... 382/251 |
| 5,870,499 A | * | 2/1999 | Bender et al. .............. 382/232 |
| 6,024,287 A | | 2/2000 | Takai et al. ................. 235/493 |
| 6,192,138 B1 | | 2/2001 | Yamadaji .................... 382/100 |
| 6,208,735 B1 | | 3/2001 | Cox et al. ..................... 380/54 |
| 6,341,350 B1 | | 1/2002 | Miyahara et al. ........... 713/176 |
| 6,466,209 B1 | * | 10/2002 | Bantum ...................... 345/589 |
| 6,546,145 B1 | | 4/2003 | Miyake et al. .............. 382/248 |
| 2001/0030769 A1 | * | 10/2001 | Jacobs ........................ 358/429 |

FOREIGN PATENT DOCUMENTS

| | | |
|---|---|---|
| JP | 63-214067 | 9/1988 |
| JP | 01-292965 | 11/1989 |
| JP | 5-301380 | 11/1993 |
| JP | 7-123243 | 5/1995 |
| JP | 11-75053 | 3/1999 |
| JP | 11-75055 | 3/1999 |
| JP | 2000-151984 | 5/2000 |
| JP | 2000-350002 | 12/2000 |

OTHER PUBLICATIONS

K. Matsui, "Digital Watermarking and its Evaluation Items", IIEEJ Journal, vol. 27, No. 5, pp. 483–491, (1998).
R. Floyd et al., "An Adaptive Algorithm for Spatial Grayscale", SID Symposium Digest of Paper, pp. 36–37, (1975).

* cited by examiner

Primary Examiner—Samir Ahmed
Assistant Examiner—Anand Bhatnagar
(74) Attorney, Agent, or Firm—Fitzpartick, Cella, Harper & Scinto

(57) ABSTRACT

Upon embedding additional information in image information, since an image region in which the additional information can be embedded is limited, the information size that can be embedded is often limited, and all pieces of additional information cannot be embedded. Before the additional information is embedded in the image information, distribution information of pixel values is obtained by scanning the image information, and the information size that can be embedded is detected and displayed on the basis of the obtained distribution information of pixel values.

5 Claims, 22 Drawing Sheets

FIG. 1
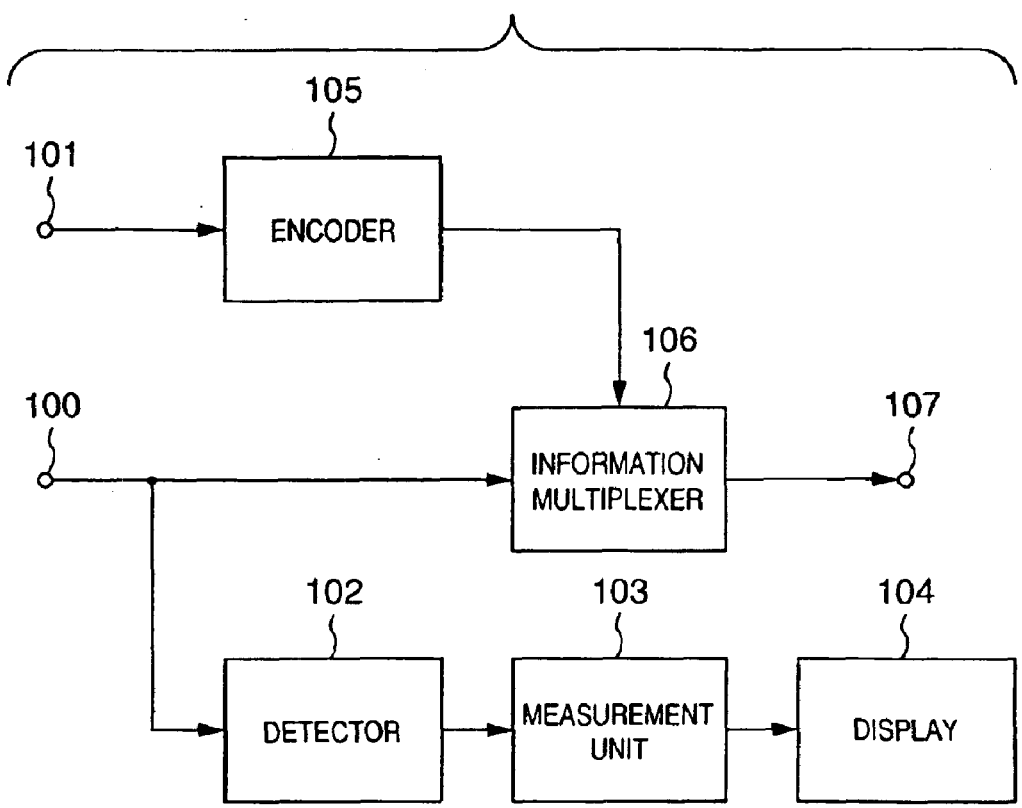
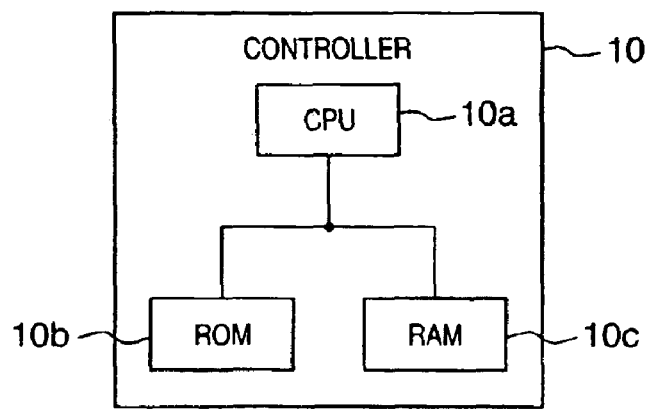

FIG. 4
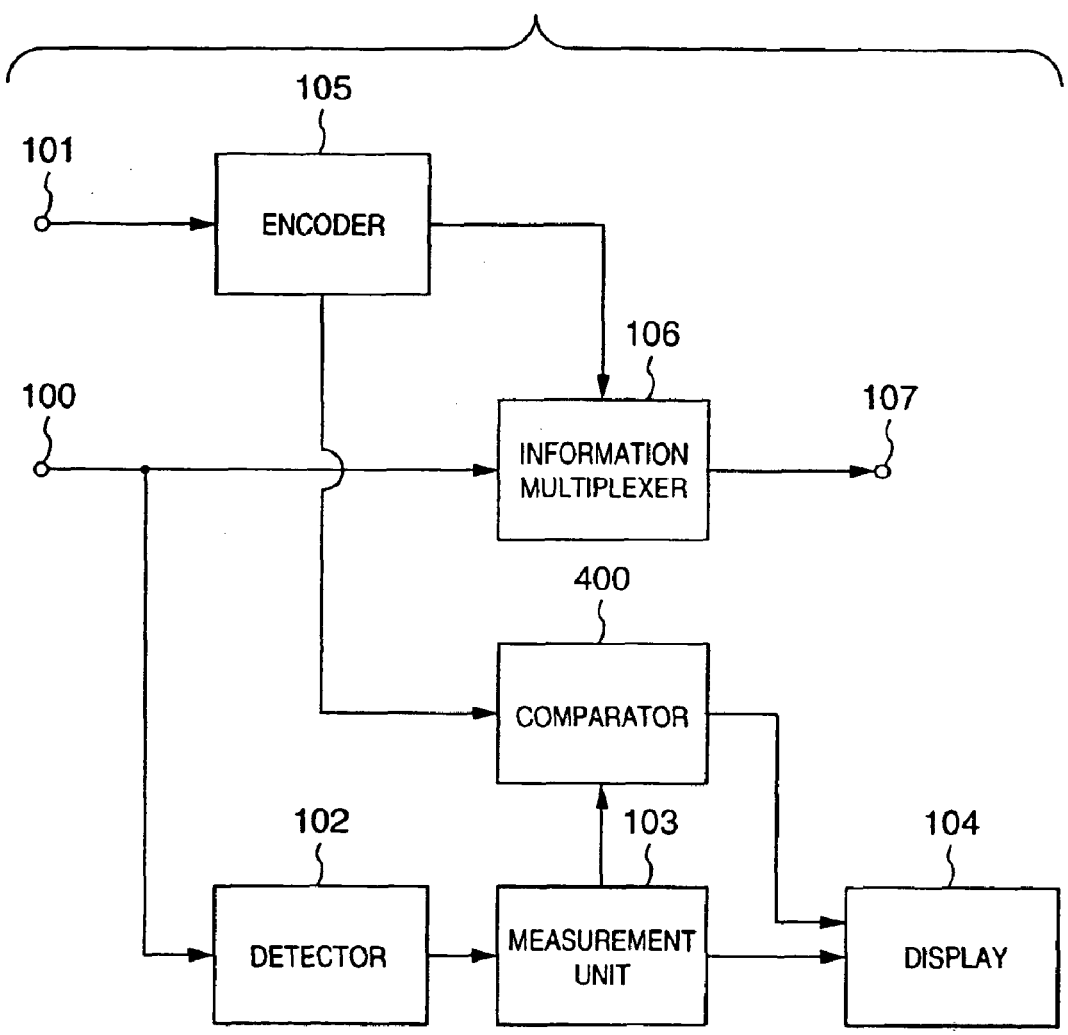
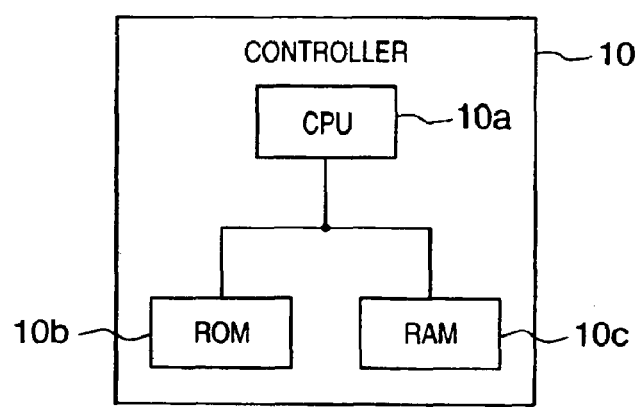

FIG. 6
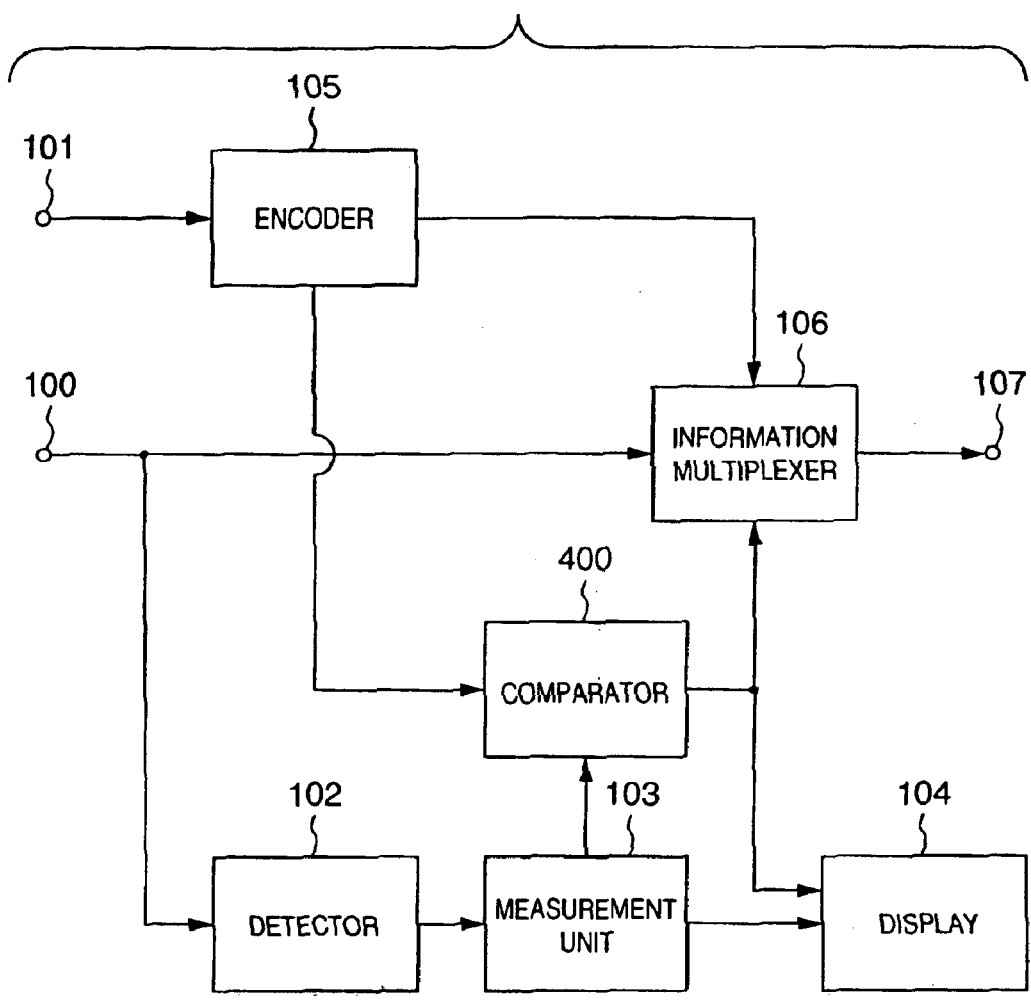
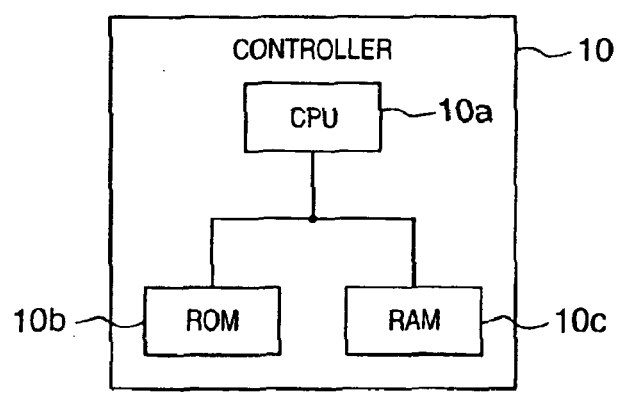

FIG. 15

|   | a | b |   |
|---|---|---|---|
| c | d | e | f |
| g | h | * |   |

FIG. 16A

|   | x | x |   |
|---|---|---|---|
| 0 | 0 | 0 | 0 |
| 0 | 1 | * |   |

FIG. 16B

|   | 0 | 0 |   |
|---|---|---|---|
| x | 0 | 1 | 0 |
| x | 0 | * |   |

FIG. 17

|   |   | * | 2 | 1 |
|---|---|---|---|---|
| 1 | 1 | 2 | 1 |   |

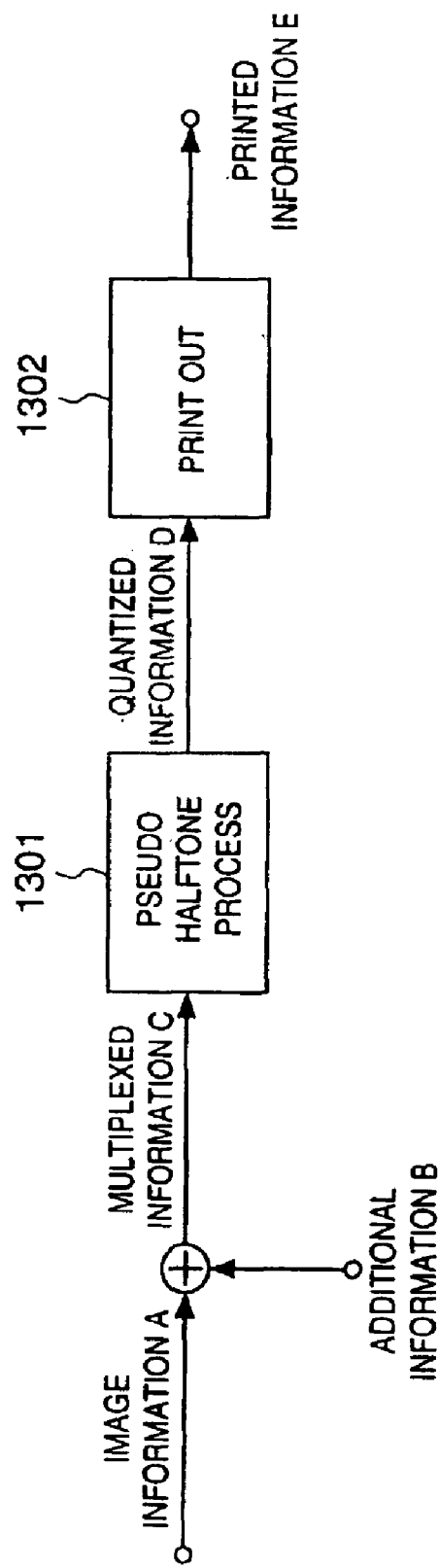

IMAGE PROCESSING APPARATUS AND METHOD

This application is a continuation of application Ser. No. 09/537,688, filed Mar. 29, 2000 now abandoned.

FIELD OF THE INVENTION

The present invention relates to an image processing apparatus and method and, more particularly, to an image processing apparatus and method for multiplexing another information onto image information.

BACKGROUND OF THE INVENTION

Various techniques for multiplexing, onto image information, a different kind of information have been proposed as copyright protection, forgery prevention of banknotes, protection of secret information, and transmission methods of text data and sound data including audio data.

In recent years, a technique called digital watermarking, which multiplexes, onto image information such as a photo, painting, or the like, additional information including the copyright holder name, permission/denial of use, and the like so as to be hard to visually detect, and distributes such information via a network such as the Internet or the like, has prevailed.

For example, "Digital Watermarking and its Evaluation items", *IIEEJ Journal*, Vol. 27, No. 5, p. 483, 1998 has announced various digital watermarking techniques. Information multiplexing methods are roughly categorized into a method of embedding information in the frequency domain and a method of embedding information in the real space domain. When information is embedded in the frequency space, image information is converted into that in the frequency domain using given means such as Fourier transformation or the like, and information is then multiplexed using frequency components, phase components, or the like. On the other hand, when information is embedded in the real space domain, information is multiplexed using the value of the least significant bit and quantization errors.

Current information multiplexing mainly aims at copyright protection of digital images and the like, and data to be multiplexed are often limited to the copyright holder name, place, date of creation, and the like.

On the other hand, as methods of mixing an image containing a text document or the like and another kind of variable-length information such as audio data or the like in a single medium, a method of describing information in a blank, a method of describing information using ink which is quite different from inks that form an image, and a method of mixing a code having a shape independently of the image information as information although ink that forms the image is used are known.

As another application field of such technique, as image forming apparatuses such as copying machines, printers, and the like attain higher image qualities, a technique for embedding additional information into an image to specify the output device model and model number from the image output onto a recording sheet for the purpose of preventing securities such as banknotes, revenue stamps, and the like from being forged is known.

For example, a technique for multiplexing information by embedding additional information in the high-frequency range of color difference and saturation components with low visual sensitivity has been known.

However, the conventional multiplexing technique suffers the following problems.

When information is multiplexed using the frequency domain, since frequency components that each image requires differ depending on images, the data size of additional information that can be multiplexed while suppressing deterioration of image quality is determined for each image of interest. Hence, when the additional information size is large, the frequency domain required for multiplexing increases, and it is often impossible to multiplex all pieces of information in some images.

When information is multiplexed using the real space domain, additional information embedded into a region which is easy to visually detect causes deterioration of image quality. On the other hand, when additional information is embedded into a region which is hard to decode due to influences of surrounding image information, the embedded information cannot be used. That is, a region in which additional information can be embedded is limited. As a result, the information size that can be multiplexed is limited, and all pieces of information cannot often be multiplexed.

The method of describing additional information in a blank is not desirable since a region other than an image is required. The method of using special ink is not desirable since ink other than those used in a normal print process is required and, hence, cost may rise.

FIG. 21 depicts an example of the additional information embedding method. As shown in FIG. 21, image information A and additional information B are multiplexed via an adder 1201 to generate multiplexed information C. The adder 1201 may add information in the real space of the image information A or may transform the image information A into that in the frequency domain using, e.g., Fourier transformation, or the like and may then synthesize the additional information B in the high-frequency range of the transformed information.

If it is possible to distribute the multiplexed information C generated in this way without any image processes such as various filtering processes and the like or any encoding processes such as lossy compression or the like, it is possible to decode the additional information B from the multiplexed information C. Also, image information, which is distributed on, e.g., the Internet, can also be decoded via digital filters for improving image quality such as edge emphasis, smoothing, and the like, as long as it has some noise resilience.

Assume that an image forming apparatus has only expression performance as low as two to several gray levels per color. In recent years, ink-jet printers can express several gray levels per color using inks with lower dye densities or by variably controlling the dot sizes to be output. However, such printers cannot express a photo-quality image unless a pseudo halftone process is used.

FIG. 22 depicts an example that executes a pseudo halftone process upon multiplexing additional information. That is, in addition to the arrangement shown in FIG. 21, the multiplexed information is converted into quantized information D by a pseudo halftone process 1301, and the converted information is printed out onto a recording sheet by a printer output 1302, thus obtaining printed information E that has deteriorated considerably. Hence, decoding additional information from information on a recording sheet for the purpose of preventing forgery amounts to decoding additional information from the printed information E after the series of processes shown in FIG. 22. However, the image information changes to a large extent by the two processes, i.e., the pseudo halftone process 1301 and printer output 1302. Therefore, it is very difficult to multiplex additional information so as not to be visually detectable, and to successfully decode the multiplexed additional information B from the printed information E.

The aforementioned multiplexing technique embeds information in the high-frequency region of an image. When the subsequent pseudo halftoning uses error diffusion, the frequency range of the additional information is buried under that of a texture produced by error diffusion due to the high-pass filter characteristics unique to error diffusion, and it becomes harder to decode the additional information. Also, in order to accurately decode the additional information from the printed information, a scanner device with very high precision is required.

That is, when the pseudo halftone process must be done, the multiplexing method shown in FIG. 13 is not suitable. In other words, an additional information multiplexing method that fully utilizes the characteristics of the pseudo halftone process is needed.

There are techniques combining multiplexing of additional information and redundancy of the pseudo halftone process.

In the techniques, upon binarization using ordered dithering, additional data is mixed into an image signal by selecting one of dither matrices indicating an identical gray level. However, in ordered dithering, it is difficult to output a photo-quality image unless a printer having a high resolution and very high mechanical precision is used. Small mechanical precision errors are produced as low-frequency noise such as horizontal stripes or the like, and are easily visually detectable on paper. When the dither matrices are periodically changed, a specific frequency range generated by a regular dither pattern is disturbed, thus adversely influencing image quality. Also, the decoder must decode additional information by estimating the dither matrix used in binarization while the pixel values of image information as an original signal are unknown and, hence, it is hard to attain accurate decoding.

The second technique has proposed a method of multiplexing additional information using a color dither pattern method. In the second technique, deterioration of image quality upon switching the dither matrices cannot be avoided as in the first technique. Compared to the first technique, a larger number of pieces of additional information can be multiplexed, but the color tincture changes since the sequence of color components changes, and image quality deteriorates considerably in a portion with little grayscale change. Also, decoding becomes more harder to attain.

In any case, these methods that change the dither matrices suffer the problem that decoding is hard to attain despite the fact that image quality deteriorates considerably.

Method of embedding large-size information such as audio information in an image is known. In this method, audio information is converted into a dot code so-called a two-dimensional barcode, and the barcode is printed on a blank of an image or inside the image. However, this method neither multiplexes a dot code as additional information on image information nor appends additional information (dot code) so as to be hard to visually detect. This reference describes only one example for embedding a code using transparent paint as a devise for making a dot code hard to visually detect. However, since special ink is required, the cost inevitably increases, and the quality of an image printed out on a recording sheet deteriorates.

SUMMARY OF THE INVENTION

The present invention has been made to solve the aforementioned problems, and has as its object to provide an image processing apparatus and method which can detect the size of information that can be multiplexed.

In order to achieve the above object, a preferred embodiment of the present invention discloses an image processing apparatus, which has embedding means for embedding information in image information, comprising: obtaining means for obtaining distribution information of pixel values by scanning the image information before the information is embedded by the embedding means; and detection means for detecting an information size, that can be embedded by the embedding means, on the basis of the obtained distribution information of pixel values.

It is another object of the present invention to provide an image processing apparatus and method, which can determine whether multiplexing is possible.

In order to achieve the above object, a preferred embodiment of the present invention discloses comparison means for comparing the information size detected by said detection means with an information size of information to be embedded; and determination means for determining on the basis of a comparison result whether multiplexing is possible.

It is still another object of the present invention to provide an image processing apparatus and method, which can control information multiplexing on the basis of the determination result of whether multiplexing is possible.

In order to achieve the above object, a preferred embodiment of the present invention discloses control means for controlling the embedding means on the basis of the determination result of said determination means.

It is still another object of the present invention to provide an image processing apparatus and method, which can control the size of information to be multiplexed to that which can be multiplexed.

In order to achieve the above object, a preferred embodiment of the present invention discloses an image processing apparatus, which has embedding means for embedding coded information in image information, comprising: obtaining means for obtaining distribution information of pixel values by scanning the image information before the information is embedded by the embedding means; detection means for detecting an information size, that can be embedded by the embedding means, on the basis of the obtained distribution information of pixel values; and control means for controlling an encoding condition of the coded information on the basis of the detected information size that can be embedded.

It is still another object of the present invention to provide an image processing apparatus and method, which can multiplex large additional information while suppressing deterioration of image quality of image information.

A preferred embodiment of the present invention discloses an image processing apparatus for embedding additional information in image information, comprising: quantization means for quantizing the image information by a pseudo halftone process; embedding means for embedding a quantization value pattern indicating the additional information in the quantized image information by controlling a quantization condition of said quantization means; and control means for controlling embedding of the quantization value pattern in accordance with an information size of the additional information.

A preferred embodiment of the present invention discloses an image processing method for embedding additional information in image information, comprising the steps of: embedding, by controlling a quantization condition of a quantization process for quantizing the image information by a pseudo halftone process, a quantization value pattern indicating the additional information in the quantized image information; and controlling embedding of the quantization value pattern in accordance with an information size of the additional information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the arrangement of an image processing apparatus according to the first embodiment of the present invention;

FIG. 4 is a block diagram showing the arrangement of an image processing apparatus according to the second embodiment of the present invention;

FIG. 6 is a block diagram showing the arrangement of an image processing apparatus according to the third embodiment of the present invention;

FIG. 15 shows an example of a window of binarized information in the fifth embodiment;

FIGS. 16A and 16B show examples of target patterns in the fifth embodiment;

FIG. 17 shows an example of a diffusion matrix in error diffusion;

FIG. 22 is a block diagram showing another example of multiplexing.

DETAILED DESCRIPTION OF THE PREFERRED EMBODIMENTS

Figure 2:
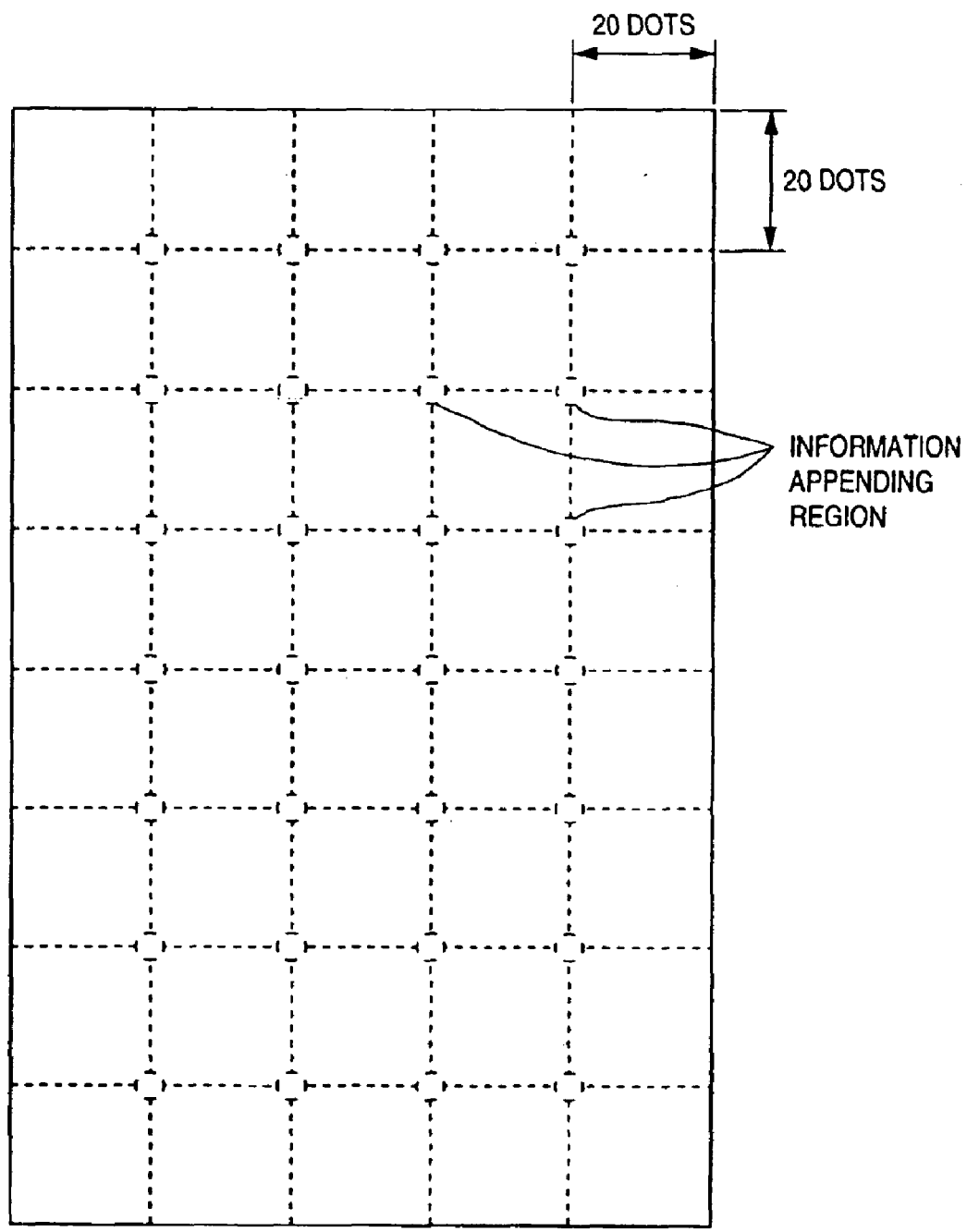
FIG. 2 is a view for explaining an information multiplexing method onto image information.

An image processing apparatus according to an embodiment of the present invention will be described in detail hereinafter with reference to the accompanying drawings.

In each of the following embodiments, the arrangement and method of multiplexing, onto image information, a different kind of information, and the arrangement and method of detecting the size of information that can be multiplexed will be explained in detail. However, image information on which information is to be multiplexed, and multiplexing conditions are not limited to those in the following description, and the arrangements and methods to be described below are effective for every conditions to which the present invention can be applied. Furthermore, a different kind of information to be appended (to be simply referred to as "additional information" hereinafter) is not limited to character information such as text, symbols, and the like, but includes information such as sound or image information containing audio information. Also, various encoding methods may be used upon encoding additional information.

[First Embodiment]

[Arrangement]

FIG. 1 is a block diagram showing the arrangement of an image processing apparatus according to the first embodiment of the present invention.

Referring to FIG. 1, reference numeral 10 denotes a controller which includes a CPU 10a, ROM 10b, RAM 10c, and the like, and controls the operations and processes of the individual building components to be described below. Especially, the CPU 10a controls multiplexing and associated processes in accordance with programs pre-stored in the ROM 10b using the RAM 10c as a work memory.

Reference numeral 100 denotes an input terminal of image information on which additional information is multiplexed; and 101, an input terminal of additional information.

Reference numeral 102 denotes a detector for detecting the distribution of pixel values by scanning the input image information; 103, a measurement unit for measuring the size of information that can be multiplexed using a given multiplexing means on the basis of the detected distribution of pixel values; and 104, a display such as a CRT, LCD, or the like for displaying the measured size of information that can be multiplexed.

As a multiplexing means, an information appending means which defines a feature by a specific combination of quantization values of a plurality of pixels by changing the quantization value of the pixel of interest in pseudo halftoning may be used. In the first embodiment, as a simpler example, 1-bit encoded information is appended to each of lattice points at 20-dot intervals on high-resolution image information binarized by error diffusion, as shown in FIG. 2. The ON/OFF state of information is expressed by the presence/absence of an ON signal at each lattice point.

Since dots with 0% density are scarcely distributed in a high-density portion of an image binarized by error diffusion, two or more dots with 0% density rarely appear at neighboring positions. Conversely, since dots with 100% density are scarcely distributed in a low-density portion, two or more dots with 100% density rarely appear at neighboring positions. However, in a middle-density portion, since dots with 100% and 0% densities are crowded, dots with identical density are highly likely to appear at neighboring positions. For this reason, an ON signal to be appended is expressed by a set of four dots with 100% density if the average density of pixel values around an information appending region is low, or by a set of four dots with 0% density if it is high. In this case, information is not appended to a middle-density region where a set of four dots become featureless compared to surrounding pixels, and it is hard to identify information.

Referring back to FIG. 1, reference numeral 105 denotes an encoder for encoding the input additional information. For example, the encoder 105 encodes information by, e.g., Huffman coding. Reference numeral 106 denotes an information multiplexer for multiplexing information in accordance with the aforementioned information multiplexing means. Reference numeral 107 denotes a terminal for outputting image information on which additional information is multiplexed.

[Processing]

Figure 3:
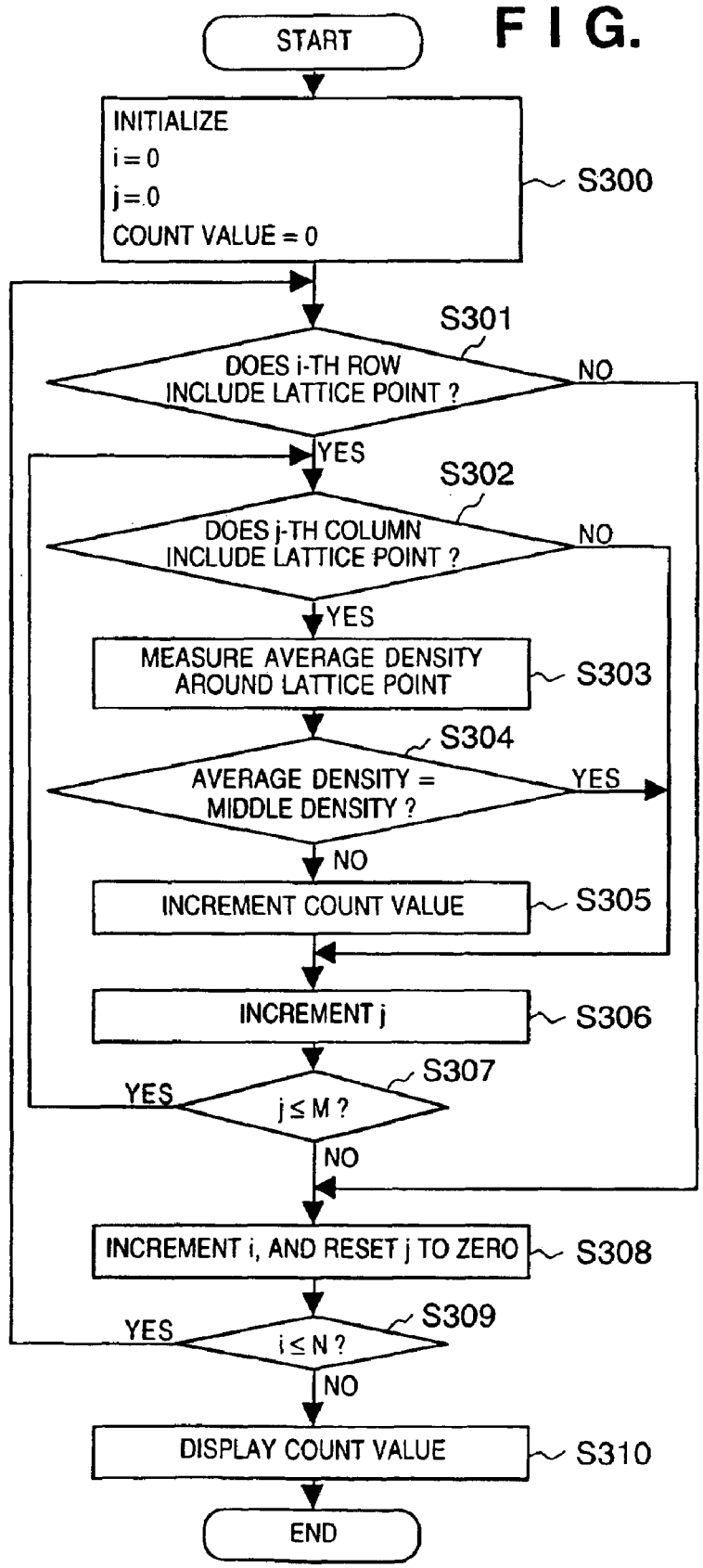
FIG. 3 is a flow chart showing the operation sequence of the first embodiment.

FIG. 3 is a flow chart showing the operation sequence of the first embodiment. Assume that the size of image information is N×N pixels (vertical×horizontal).

In step S300, variables i and j, and the multiplexable information size count value are initialized. Note that variable i counts the vertical (row) addresses (pixel positions), and variable j counts the horizontal (column) addresses (pixel positions). Pixel positions indicated by variables i and j will be respectively referred to as row and column addresses hereinafter.

It is checked in step S301 if row address i indicates a row including a lattice point, and it is checked in step S302 if column address j indicates a column including a lattice point. If YES in steps S301 and S302, the average density of pixels around the lattice point is measured in step S303. It is checked in step S304 if the measured average density is a middle density at which information cannot be multiplexed. If NO in step S304, the multiplexable information size count value is incremented in step S305.

If it is determined in step S302 that the column of interest does not include any lattice point, if it is determined in step S304 that the measured average density is a middle density, or after the process in step S305, the flow advances to step S306 to increment column address j to horizontally shift the pixel position to be scanned. In step S307, column address j and horizontal size M of an image are compared. If j≦M in step S307, the flow returns to step S302.

If j>M, or if it is determined in step S301 that the row of interest does not include any lattice point, row address i is incremented, and column address j is reset to zero in step S308 so as to vertically shift the pixel position to be scanned. In step S309, row address i and vertical size N of an image are compared. If i≦N, the flow returns to step S301, thus repeating the processes in steps S301 to S309.

If it is determined in step S309 that the processes for N rows are complete, the count value indicating the multiplexable information size is displayed in step S310, thus ending this processing.

According to the first embodiment, since the information size that can be multiplexed onto an image can be measured in advance before multiplexing, a target information size can be obtained upon creation, selection, modification, and the like of additional information, and creation, selection, modification, and the like of additional information can be efficiently done.

In the above description, information is appended to each lattice point in the real space domain. However, the first embodiment is not limited to such specific example, but can be applied to every other methods for appending information.

In the above example, multiplexing is implemented by appending an ON signal to a high- or low-density portion. However, the first embodiment is not limited to such specific example, but can be applied to every other signal appending methods.

[Second Embodiment]

An image processing apparatus according to the second embodiment of the present invention will be described below. Note that the same reference numerals in the second embodiment denote the same parts as those in the first embodiment, and a detailed description thereof will be omitted.

FIG. 4 is a block diagram showing the arrangement according to the second embodiment of the present invention.

The second embodiment comprises a comparator 400 which compares the multiplexable information size measured by the measurement unit 103, and the size of additional information encoded by the encoder 105 to determine whether multiplexing is possible. Based on the comparison result of the comparator 400, whether multiplexing is possible is displayed on the display 104. Note that it is effective to display a reason when multiplexing is impossible, in addition to display of whether multiplexing is possible.

Figure 5:
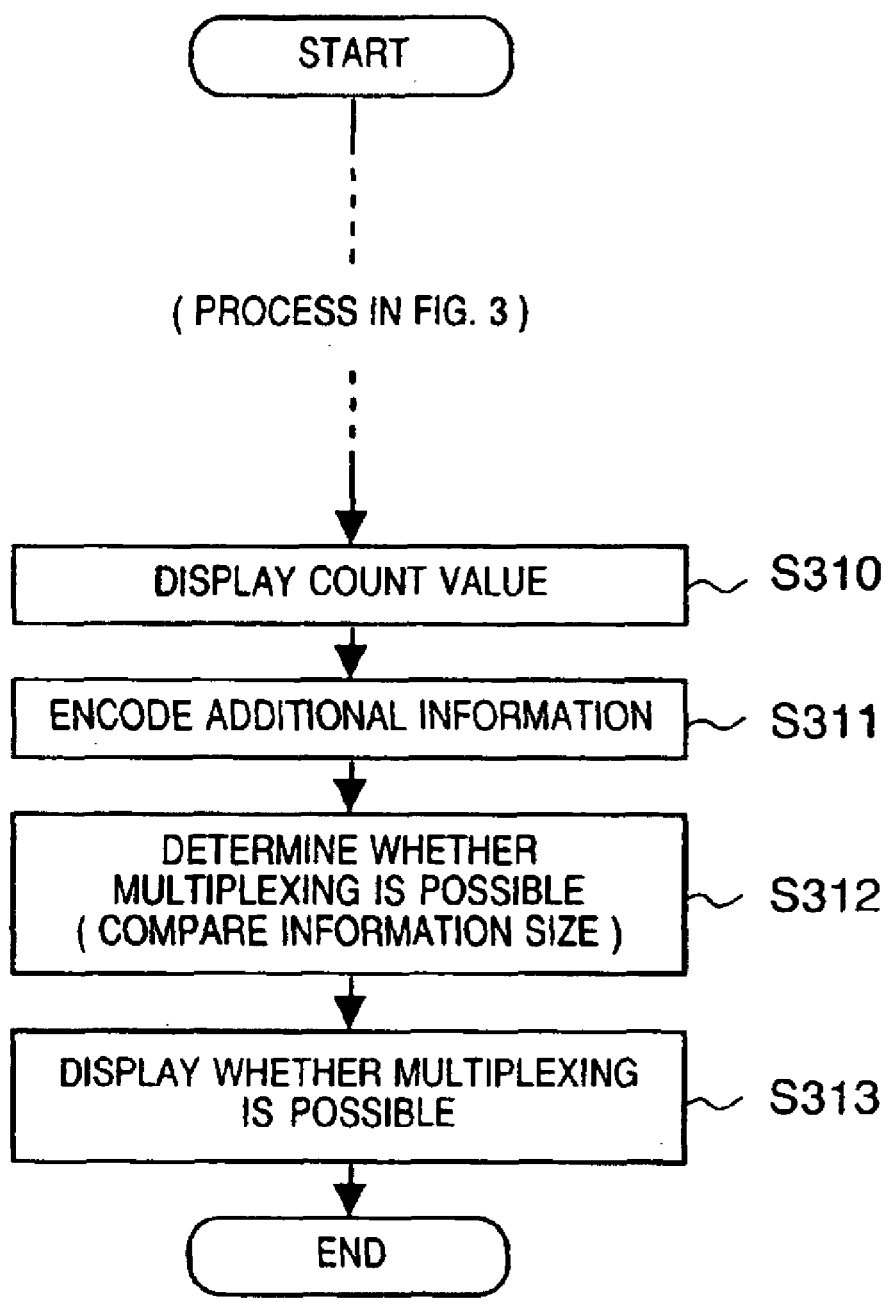
FIG. 5 is a flow chart showing the operation sequence of the second embodiment.

FIG. 5 is a flow chart showing the operation sequence of the second embodiment, and shows processes in step S310 and subsequent steps, since steps S300 to S310 are the same as those in the first embodiment shown in FIG. 3.

Additional information is encoded by the encoder 105 in step S311, and the comparator 400 compares the multiplexable information size and the size of the encoded additional information in step S312 to determine whether multiplexing is possible. In step S313, display that pertains-information as to whether multiplexing is possible is made on the display 104.

Note that FIG. 5 shows an example in which additional information is encoded after the multiplexable information size is detected and displayed. However, since additional information can be encoded independently, encoding may be done before, after, or during the detection & display processes of the multiplexable information size. Also, the multiplexable information size may not be displayed, or it is effective to display the multiplexable information size depending on the determination result of whether multiplexing is possible.

According to the second embodiment, since the information size that can be multiplexed onto an image can be measured in advance before multiplexing, a target information size can be obtained upon creation, selection, modification, and the like of additional information, and creation, selection, modification, and the like of additional information can be efficiently done. Furthermore, when image information on which information is to be multiplexed, and additional information and its encoding conditions are determined, whether multiplexing is possible can be determined before multiplexing. As a result, when there are a plurality of combinations of image information on each of which information is to be multiplexed, and additional information and its encoding conditions, multiplexable combinations of them can be efficiently selected.

[Third Embodiment]

An image processing apparatus according to the third embodiment of the present invention will be described below. Note that the same reference numerals in this embodiment denote the same parts as those in the first and second embodiments, and a detailed description thereof will be omitted.

FIG. 6 is a block diagram showing the arrangement according to the third embodiment of the present invention.

The third embodiment controls multiplexing executed by the information multiplexer 106 on the basis of the comparison result of the multiplexable information size measured by the measurement unit 103 and the size of additional information encoded by the encoder 105 by the comparator 400, i.e., the determination result of whether multiplexing is possible.

Figure 7:
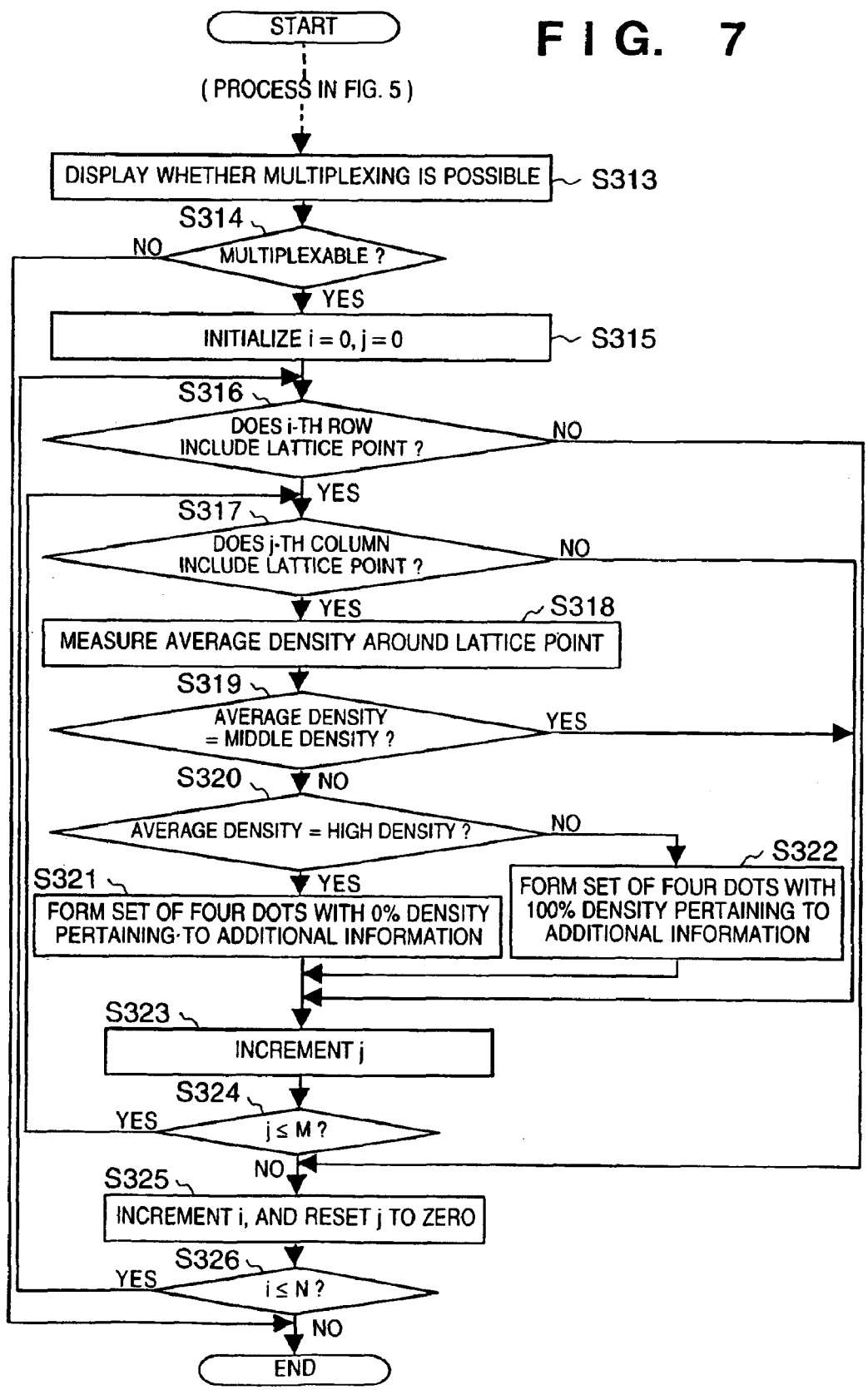
FIG. 7 is a flow chart showing the operation sequence of the third embodiment.

FIG. 7 is a flow chart showing the operation sequence of the third embodiment, and shows the processes in step S313 and subsequent steps, since steps S300 to S313 are the same as those in the second embodiment shown in FIG. 5.

After whether multiplexing is possible is displayed in step S313, the flow branches depending on the determination result of whether multiplexing is possible in step S314. That is, if multiplexing is impossible, the processing ends; otherwise, a multiplexing process in step S315 and subsequent steps is done.

In step S315, variables i and j are initialized. Note that variable i is a row address counter, and variable j is a column address counter.

It is checked in step S316 if row address i indicates a row including a lattice point, and it is checked in step S317 if column address j indicates a column including a lattice point. If YES in steps S316 and S317, the average density of pixels around the lattice point is measured in step S318. It is checked in step S319 if the measured average density is a middle density at which information cannot be multiplexed.

If NO in step S319, the flow branches depending on the average density in step S320. That is, if the average density is high, a set of four dots with 0% density for expressing additional information are formed in step S321; if the average density is low, a set of four dots with 100% density for expressing additional information are formed in step S322.

If it is determined in step S317 that the column of interest does not include any lattice point, if it is determined in step S319 that the measured average density is a middle density, or after the process in step S321 or S322, the flow advances to step S323 to increment column address j to horizontally shift the pixel position to be scanned. In step S324, column address j and horizontal size M of an image are compared. If j≦M in step S324, the flow returns to step S317.

If j>M, or if it is determined in step S316 that the row of interest does not include any lattice point, row address i is incremented, and column address j is reset to zero in step S325 so as to vertically shift the pixel position to be scanned. The processes in steps S316 to S326 are repeated until it is determined in step S326 that row address i and vertical size N of the image satisfy i>N, thus ending the processing.

Note that FIG. 7 shows an example in which additional information is encoded after the multiplexable information size is detected and displayed. However, since additional information can be encoded independently, encoding may be done before, after, or during the detection & display processes of the multiplexable information size. Also, the multiplexable information size need not be displayed, or it is effective to display the multiplexable information size depending on the determination result of whether multiplexing is possible.

According to the third embodiment, in addition to the effects obtained by the first and second embodiments, since determination of whether multiplexing is possible and the multiplexing process itself are done in series, image information, additional information, or encoding conditions as elements of multiplexing must be changed only when multiplexing is impossible. Therefore, when multiplexing is possible, the multiplexing process of information is subsequently done, thus reducing the loads on the operator and attaining efficient information multiplexing processes. Even when multiplexing is impossible, the size of additional information which can be multiplexed onto the currently selected image information is displayed together with that determination result, and can be used as a reference upon changing the additional information or its encoding conditions.

[Fourth Embodiment]

An image processing apparatus according to the fourth embodiment of the present invention will be described below. Note that the same reference numerals in this embodiment denote the same parts as those in the first, second, and third embodiments, and a detailed description thereof will be omitted.

Figure 8:
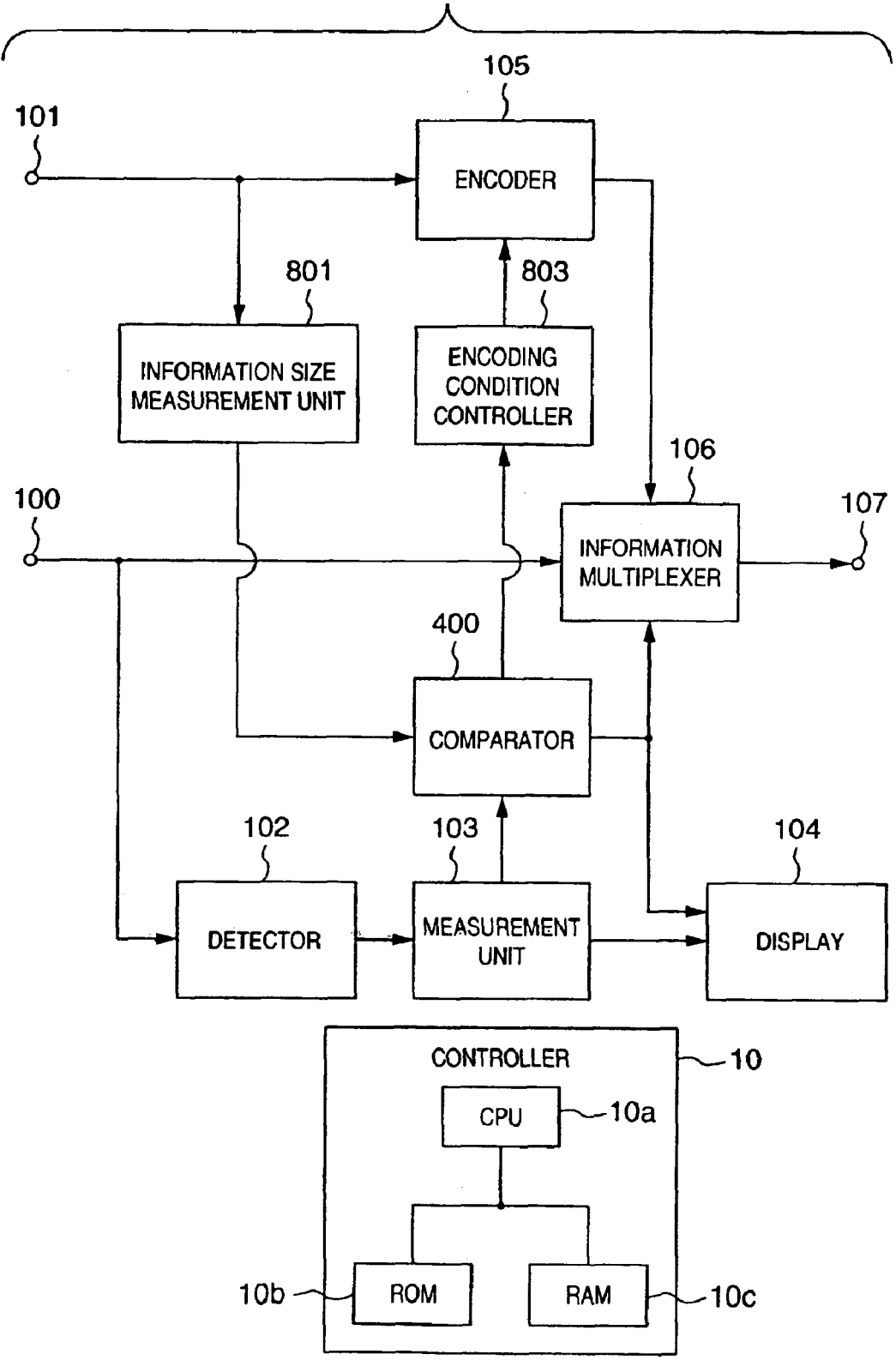
FIG. 8 is a block diagram showing the arrangement of an image processing apparatus according to the fourth embodiment of the present invention.

FIG. 8 is a block diagram showing the arrangement according to the fourth embodiment of the present invention.

The fourth embodiment implements information multiplexing with very high efficiency by reflecting the determination result of whether multiplexing is possible in encoding conditions of additional information.

An information size measurement unit 801 measures the size of the input additional information. The comparator 400 outputs the comparison result between the additional information size obtained from the information size measurement unit 801, and the size of image information obtained by the measurement unit 103. An encoding condition controller 803 determines the encoding conditions of additional information on the basis of the comparison result of the information sizes obtained from the comparator 400, and sets the determined conditions in the encoder 105.

For example, the encoding condition controller 803 can change the information size by changing the sampling rate of sound information. More specifically, using the ratio between the multiplexable information size and the size of additional information as a factor upon changing the sampling rate, it can be effectively reflected in the encoding conditions. When the sampling rate of, e.g., sound information is to be changed, if the sampling rate is lowered too much, information that the additional information originally has may be lost. Hence, it is effective to make the comparator 400 determine whether multiplexing is possible by setting a multiplexable range in advance, and to control information multiplexing on the basis of the determination result.

After the encoding conditions are determined by the encoding condition controller 803, the encoder 105 encodes additional information under the set encoding condition, and sends the encoded additional information to the information multiplexer 106, thus multiplexing information.

Figure 9:
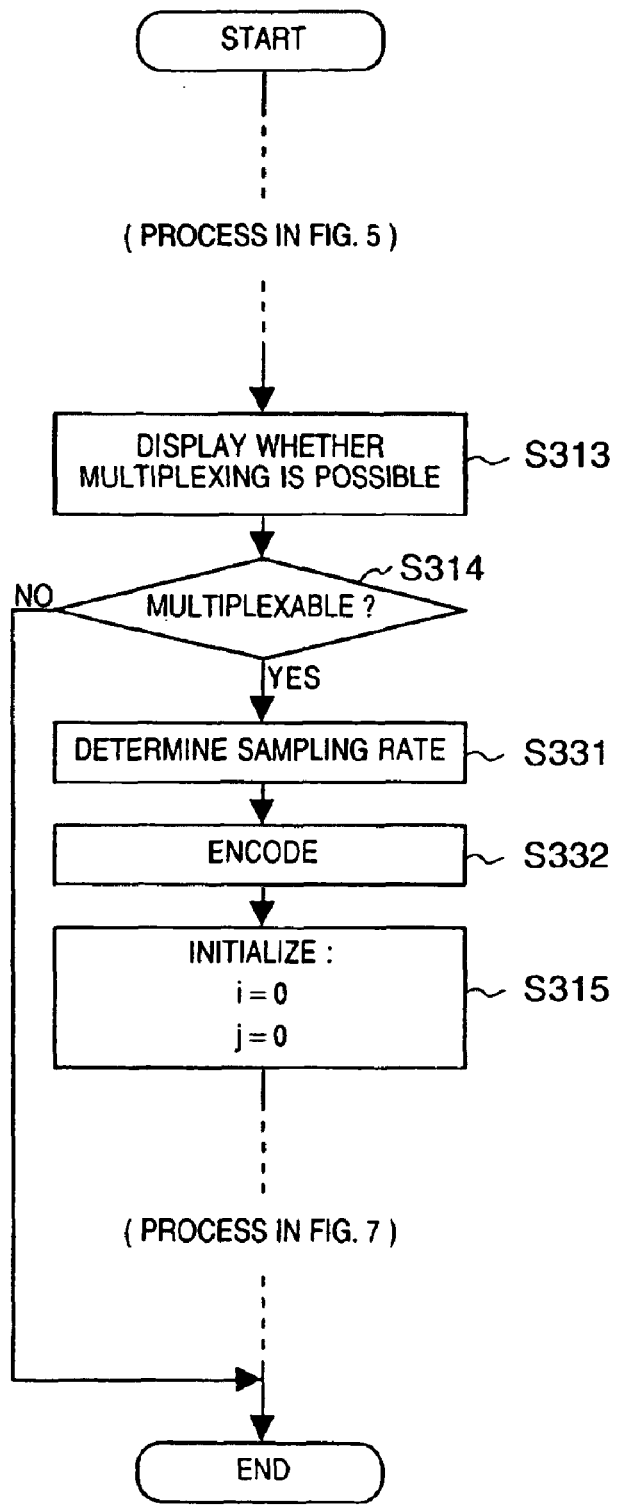
FIG. 9 is a flow chart showing the operation sequence of the fourth embodiment.

FIG. 9 is a flow chart showing the operation sequence of this embodiment. FIG. 9 shows only processes around steps S331 and S332, since processes other than those in steps S331 and S332 are the same as those in the third embodiment shown in FIG. 7 and are not shown.

If it is determined in step S314 that multiplexing is possible, the encoding condition controller 803 determines the encoding conditions required for encoding the additional information to be multiplexed in step S331. That is, the sampling rate required for encoding sound information is determined. Note that the sampling rate is determined by multiplying the sampling rate by the ratio between the size of information that can be multiplexed on image information, and that of the encoded additional information as a factor, as described above. After the encoding conditions are determined, the encoder 105 encodes the additional information in step S332.

Note that the additional information is not limited to sound information, but may be any other information as long as it can undergo lossy compression like image information, and the information size can be changed by some conditions.

According to the fourth embodiment, in addition to the effects obtained by the first to third embodiments, since the application range of multiplexing can be widened by controlling the encoding conditions of the additional information, information can be multiplexed more easily. Furthermore, since information is multiplexed by decreasing the size of the additional information, information which has a large information size that cannot be multiplexed directly can be multiplexed by a single process.

[Fifth Embodiment]

The fifth embodiment of the present invention will be described below with reference to the accompanying drawings. Note that an image processing apparatus in each of the embodiments to be described hereinafter is efficiently implemented as printer driver software in a computer that creates image information to be output to a printer engine, but may be effectively built in a copying machine, facsimile apparatus, printer, or the like as hardware or software.

[Outline]

The embodiment to be described below aims at multiplexing large-size additional information onto image information while suppressing deterioration of image quality. As a method of multiplexing additional information while suppressing deterioration of image quality, the applicants found out a method of multiplexing codes of additional information by artificially generating a pattern of quantization values, which are never generated in an ordinary pseudo halftone process, using a texture produced by error diffusion. According to this method, since only the texture pattern changes microscopically, deterioration of image quality is not visually detectable. By generating such pattern upon changing the quantization threshold value of error diffusion, the density value expressed by dot area modulation can be preserved, thus multiplexing a different kind of information very easily.

However, the multiplexing method using a texture produced by error diffusion is premised on that the additional information to be multiplexed is mainly index information such as a model name, model number, and the like. In other words, the size of information to be embedded in image information or the like is much smaller than that image information. For this reason, assuming that audio information with a large information size is to be multiplexed, it becomes often hard to multiplex all pieces of additional information in image information.

In the following embodiment, in order to allow multiplexing of large-size additional information, a multiplexing block size that serves as the allowable limit of deterioration of image quality is computed based on a value that was computed experimentally. By multiplexing 1 bit within that block size, multiplexing corresponding to the additional information size and image size can be implemented.

A case will be exemplified below wherein audio information is multiplexed onto image information.

[Arrangement]

Figure 10:
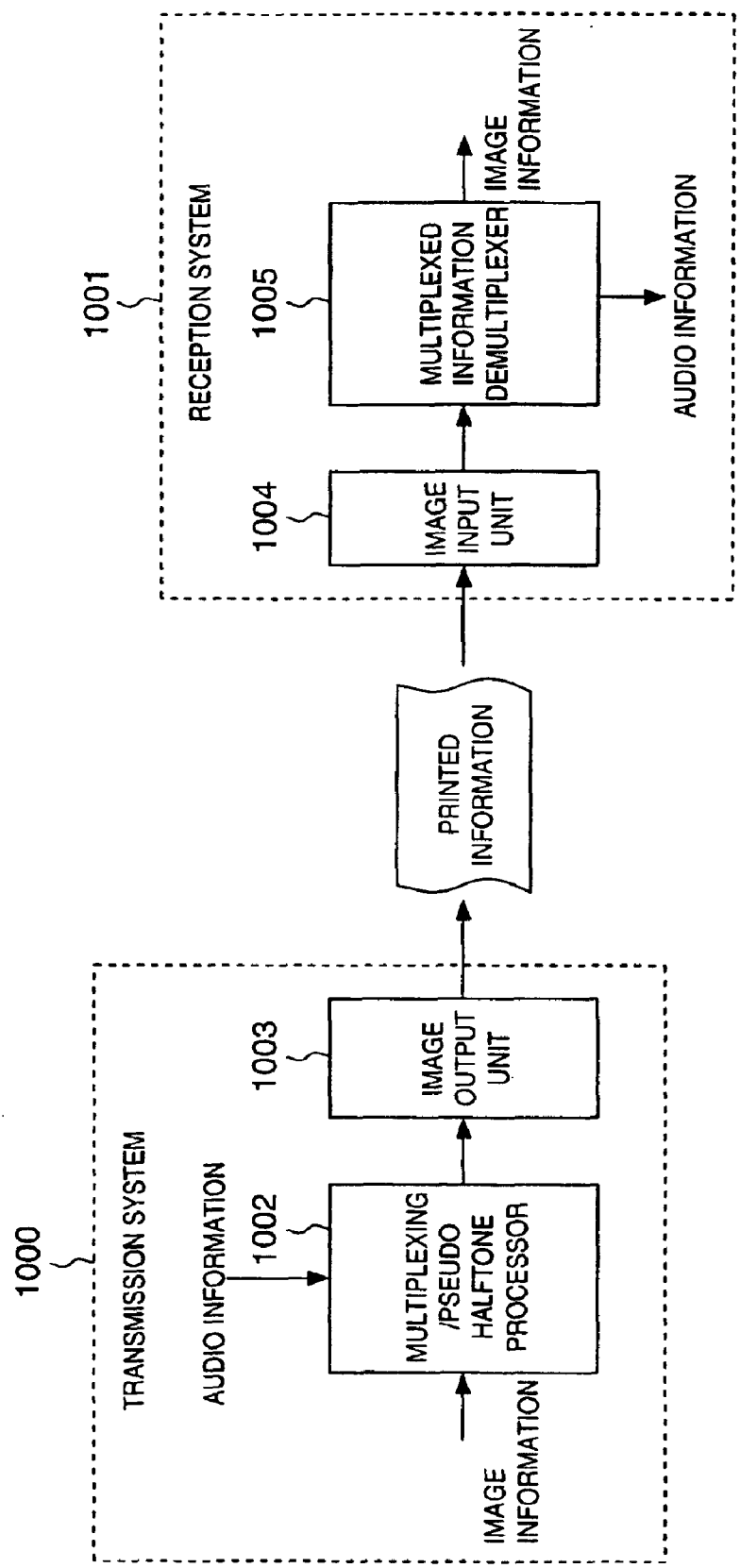
FIG. 10 is a schematic block diagram showing the arrangement of an image processing system according to the fifth embodiment of the present invention.

FIG. 10 is a schematic block diagram showing the arrangement of an image processing system of the fifth embodiment. Referring to FIG. 10, a block 1000 bounded by the broken line indicates a transmission system, and a block 1001 indicates a reception system.

In the transmission system 1000, reference numeral 1002 denotes a multiplexing/pseudo halftone processor which is a means for multiplexing the input image information and audio information to be embedded in that image. The multiplexing/pseudo halftone processor 1002 simultaneously executes multiplexing and pseudo halftoning, i.e., two processes having different purposes. Note that the multiplexing/pseudo halftone process will be explained in detail later. The information that has undergone the multiplexing/pseudo halftone process is printed out onto a medium such as a recording sheet by an output apparatus such as a printer in an image output unit 1003. Information output onto the recording sheet will be referred to as printed information hereinafter.

The printed information is sent to a certain partner at, e.g., a remote place. The reception system 1001 that receives the printed information receives two kinds of information, i.e., image information and audio information as an image on a recording sheet.

In the reception system 1001, reference numeral 1004 denotes an image input unit which inputs printed information by, i.e., an image scanner. The image scanner preferably has a resolution twice or higher the printer resolution used in the image output unit 1003 in accordance with the sampling theorem. Reference numeral 1005 denotes a multiplexed information demultiplexer, which demultiplexes information multiplexed on the input image information to obtain independent audio information. The demultiplexed audio information can be played back by a playback apparatus (not shown) in the reception system 1001.

[Multiplexing/Pseudo Halftone Processor]

The multiplexing/pseudo halftone processor 1002 as a characteristic feature of this embodiment will be described in detail below.

Figure 11:
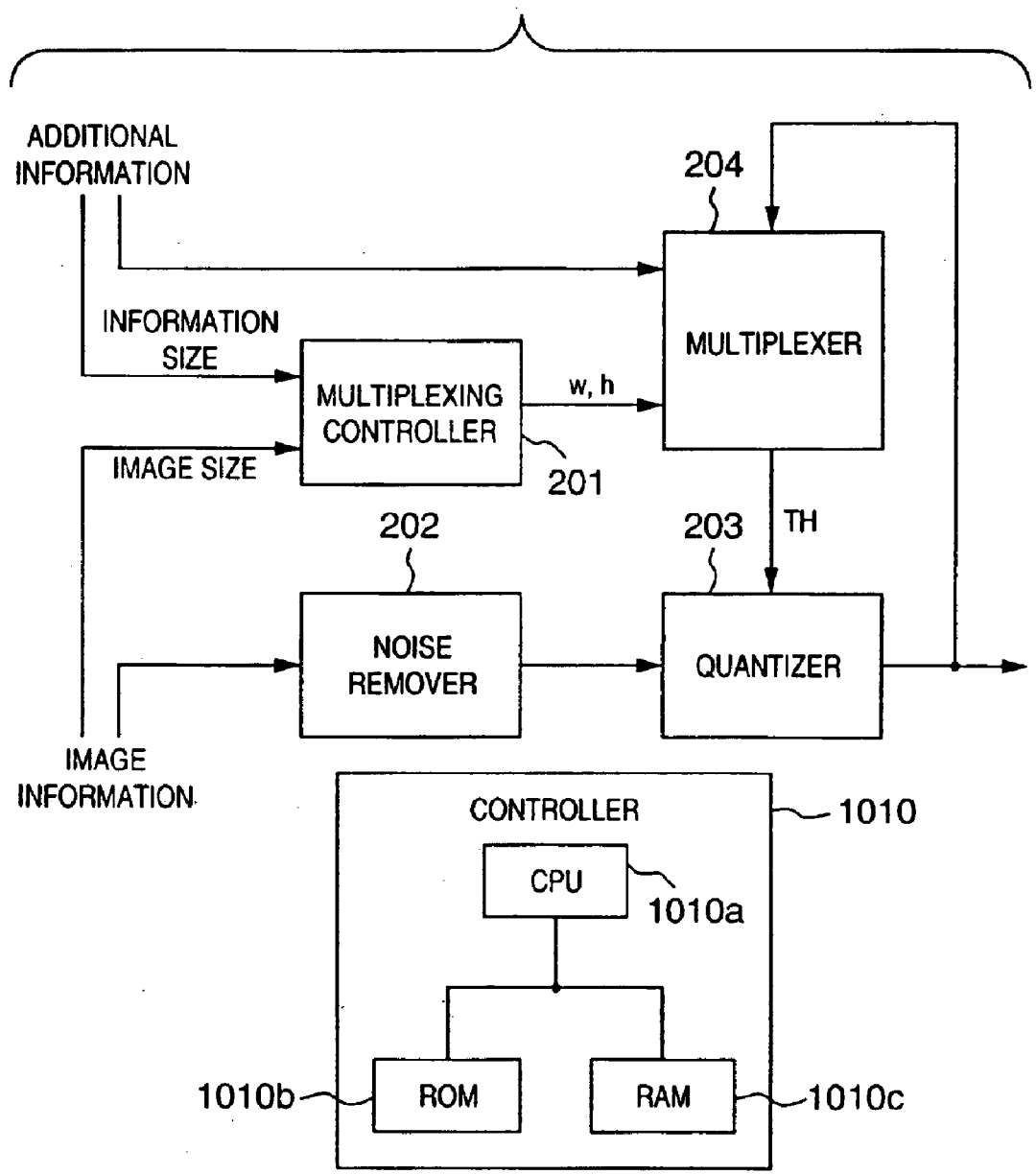
FIG. 11 is a detailed block diagram showing the arrangement of a multiplexing/pseudo halftone processor in the fifth embodiment.

FIG. 11 is a detailed block diagram showing the arrangement of the multiplexing/pseudo halftone processor 1002. Referring to FIG. 11, reference numeral 1010 denotes a controller which includes a CPU 1010a, ROM 1010b, RAM 1010c, and the like, and controls the operations and processes of the individual building components to be described below. Especially, the CPU 1010a controls multiplexing and associated processes in accordance with programs pre-stored in the ROM 1010b using the RAM 1010c as a work memory.

Reference numeral 201 denotes a multiplexing controller which receives additional information to be multiplexed onto image information, and controls multiplexing. Reference numeral 202 denotes a noise removing unit which removes a noise component having a peculiar value in image information. This noise removing method can be implemented by known filtering. Also, it is effective to use an LPF (low-pass filter) that removes not only a noise component but also a high-frequency component of an image. Reference numeral 203 denotes a quantizer which quantizes the image information multiplexed with the additional information into a number of gray levels that the printer engine in the image output unit 1003 can output. Note that quantization is implemented by pseudo halftoning. Reference numeral 204 denotes a multiplexer for multiplexing the codes of additional information by changing the quantization conditions with reference to the pattern of quantization values that have already been quantized.

[Multiplexing Controller]

Figure 12:
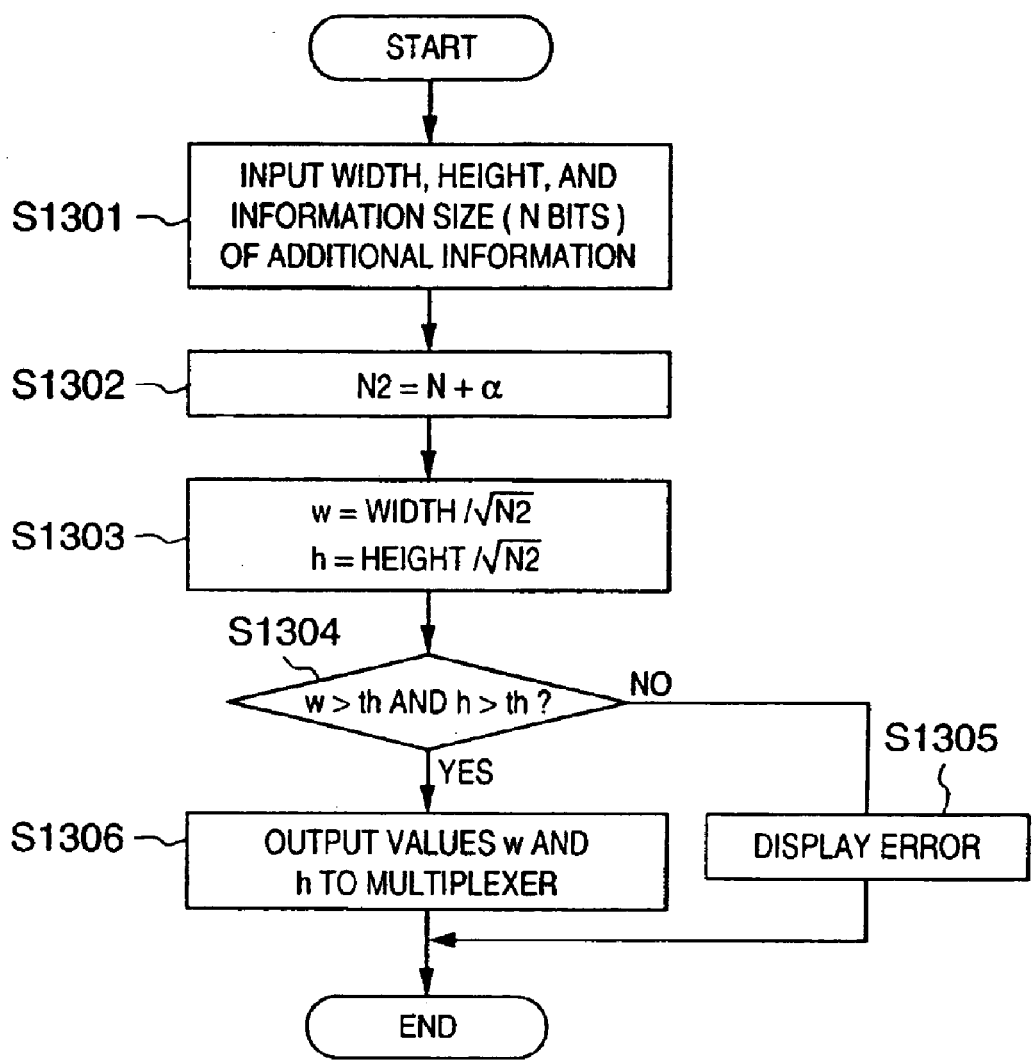
FIG. 12 is a flow chart showing the operation sequence of a multiplexing controller in the fifth embodiment.

The multiplexing controller 201 will be described in detail below. FIG. 12 is a flow chart showing the sequence of a control process in the multiplexing controller 201.

In step S1301, the number HEIGHT of vertical pixels and the number WIDTH of horizontal pixels of image information, and an information size (the number of bits) N of additional information such as audio information or the like are input. In step S1302, an information size α required for multiplexing in addition to the additional information is added to N to obtain N2. Note that α may include a marker code indicating a place of multiplexing, header information such as encoding conditions and the like, information with redundancy such as an error correction code, and the like, i.e., information required to extract at least embedded information. In step S1303, variables w and h indicating the size of a block to be multiplexed (to be described later) are computed by:

$$w = WIDTH/\sqrt{N2} \quad (1)$$

$$h = HEIGHT/\sqrt{N2} \quad (2)$$

It is then checked in step S1304 if both w and h computed in step S1303 are larger than a threshold value th which is set in advance. If one of w and h is equal to or smaller than th, since the information size of the additional information is too much larger than the image size, an error message is displayed in step S1305, thus ending the processing. Note that th may be determined by experimentally computing a limit beyond which image quality deteriorates considerably upon multiplexing additional information, or a value that makes multiplexing impossible in practice may be set. The value th is largely influenced by the engine characteristics of a printer or the like.

On the other hand, if it is determined in step S1304 that both w and h are larger than th, the values w and h are output to the multiplexer 203 in step S1306, thus ending the processing.

[Quantizer]

Figure 13:
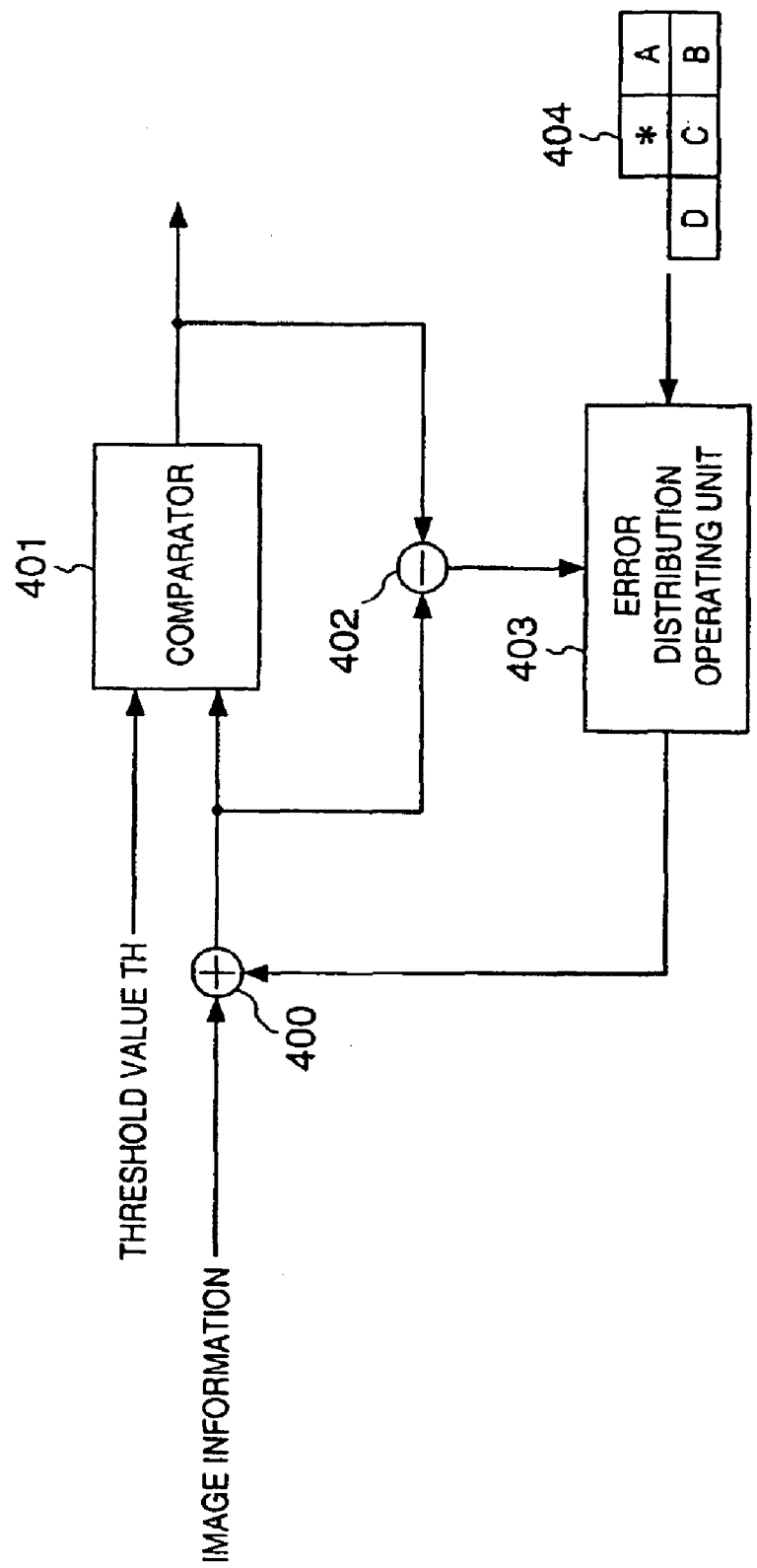
FIG. 13 is a detailed block diagram of a quantizer in the fifth embodiment.

The quantizer 203 will be described in detail below. FIG. 13 is a detailed block diagram showing the arrangement of the quantizer 203. The quantizer 203 executes pseudo halftoning using error diffusion. Note that details of a general error diffusion process are described in, e.g., R. Floyd & L. Steinberg, "An Adaptive Algorithm for Spatial Grayscale", SID Symposium Digest of Paper, p. 36–37 (1975), and a detailed description thereof will be omitted.

Error diffusion in which the quantization value is a binary value will be exemplified below.

Referring to FIG. 13, reference numeral 400 denotes an adder which adds the value of the pixel of interest of the input image information, and a quantization error distributed from surrounding pixels that have already been binarized. The sum is compared with a threshold value TH sent from the multiplexer 204 by a comparator 401, and when the sum is larger than the threshold value, a quantization value "1" is output; otherwise, "0" is output, thus quantizing the image information. When the quantization value is "1", a dot (ink, toner, or the like) is printed on a recording sheet.

Reference numeral 402 denotes a subtractor which computes any error between the quantization result output from the comparator 401 and the sum output from the adder 400, and outputs the error to an error distribution operating section 403. The error distribution operating section 403 distributes the error to surrounding pixels which are to undergo quantization next. As the error distribution ratio, an error distribution table 404 which is experimentally set on the basis of relative distances to the pixel of interest is prepared in advance, and the error is distributed to the pixels on the basis of the distribution ratios in the distribution table 404. Note that the pixel of interest is indicated by * in the distribution table 404, and an error is distributed to four surrounding pixels that neighbor the pixel of interest.

[Multiplexer]

As described above, the quantizer 203 executes a general error diffusion process. In this case, the quantization result can be controlled by changing the quantization threshold value TH input to the comparator 401. For example, when the quantization result is to be forcibly set at "1", the quantization threshold value TH can be set to be small enough to obtain the output "1" from the comparator 401.

The quantization threshold value TH is set by the multiplexer 204. The operation in the multiplexer 204 will be described in detail below. The multiplexer 204 multiplexes additional information by controlling the quantization threshold value TH to be output to the quantizer 203 with reference to the pattern of quantization values that have already been quantized.

Figure 14:
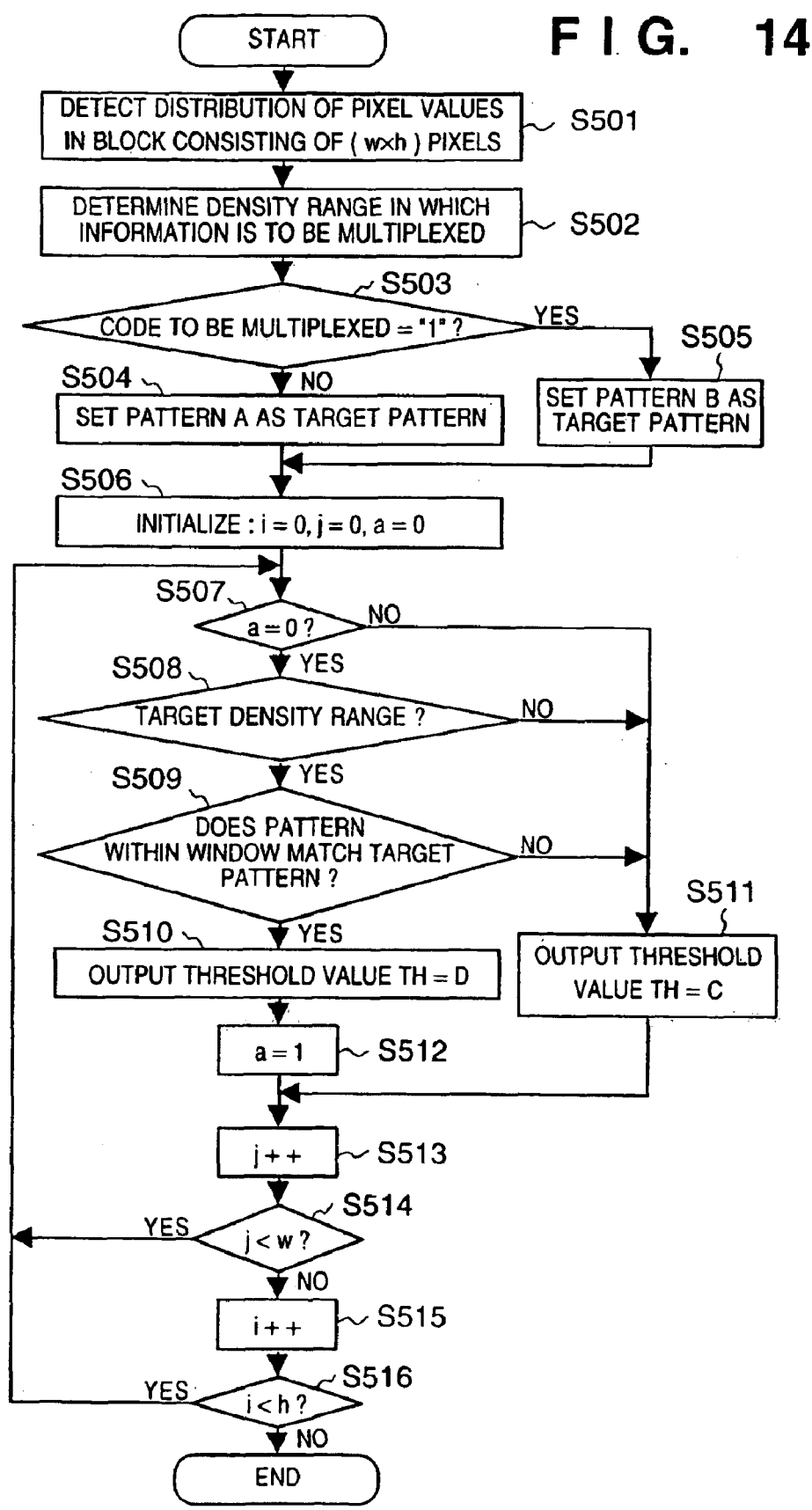
FIG. 14 is a flow chart showing the operation sequence of the multiplexer in the fifth embodiment.

FIG. 14 is a flow chart showing the control sequence of the quantization threshold value TH in the multiplexer 204. A case will be exemplified below wherein 1-bit additional information is embedded in a block consisting of w×h pixels in image information. Note that the quantization value is a binary value.

In step S501, the distribution of pixels in a block consisting of w×h pixels is detected. That is, the pixel value distribution in the block is detected by scanning all pixels in that block or scanning a plurality of sub-sampled pixels.

In step S502, a density range in which additional information is to be multiplexed is determined on the basis of the detected distribution of pixel values. In this case, the priority order of multiplexing additional information is preferably assigned in units of density ranges which are classified in advance. For example, when 8-bit (256 gray levels) tone expression is made, density ranges are classified in advance into 16 groups of 16 steps, and the priority order is determined so that the individual groups have priority in the order of low, high, and middle densities. In this example, the correspondence between priority levels 1 to 16 and the individual groups are set in, e.g., an LUT (look-up table). The order can be experimentally set in consideration of, e.g., the engine characteristics of a printer. Since it is harder to demultiplex additional information in a high-density range due to smear of ink on a recording sheet, it is preferable to preferentially multiplex additional information on a low-density range.

In this manner, in step S502 the density range included in the highest priority group is determined as that in which information is to be multiplexed by scanning pixels in the block.

It is then checked in step S503 if the additional information to be multiplexed is "1" or "0". Note that the additional information to be multiplexed in the block is 1 bit, as described above. If the additional information to be multiplexed is "0", the flow advances to step S504; if it is "1", the flow advances to step S505.

In both steps S504 and S505, a matching pattern of a window that is used to refer to a plurality of pixels around the pixel of interest, which have already been binarized, is set. That is, a pixel value pattern (to be also referred to as a target pattern hereinafter) corresponding to the density range group, which is determined in step S502 and in which additional information is multiplexed is selected from a plurality of pixel value patterns registered in advance in units of density range groups. Since two different pixel value patterns (respectively corresponding to codes "1" and "0") are present for each density range group, the number of groups×two different pixel patterns are held in advance in, e.g., a table. Therefore, pixel pattern A corresponding to code "0", which is registered in advance in correspondence with the density range group in which additional information is multiplexed, is set as a target pattern in step S504; pixel value pattern B corresponding to code "1" is set as a target pattern in step S505.

Figure 15:
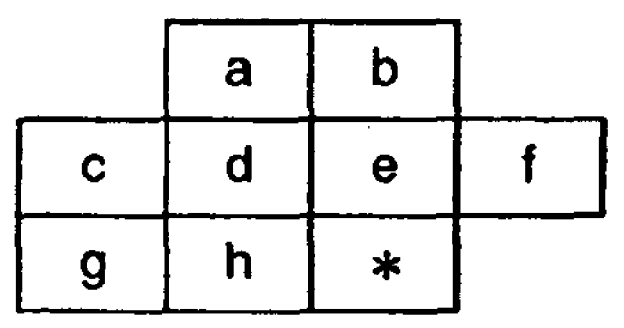

FIG. 15 shows an example of the window which is to be referred to in step S504 or S505. In FIG. 15, * indicates the pixel of interest, and a, b, c, d, e, f, g, and h indicate pixels which have already been binarized. Since the number of pixels to be referred to within this window is eight, there are 256 different combinations of patterns that the pixels to be referred to can assume.

Figures 16A, 16B:
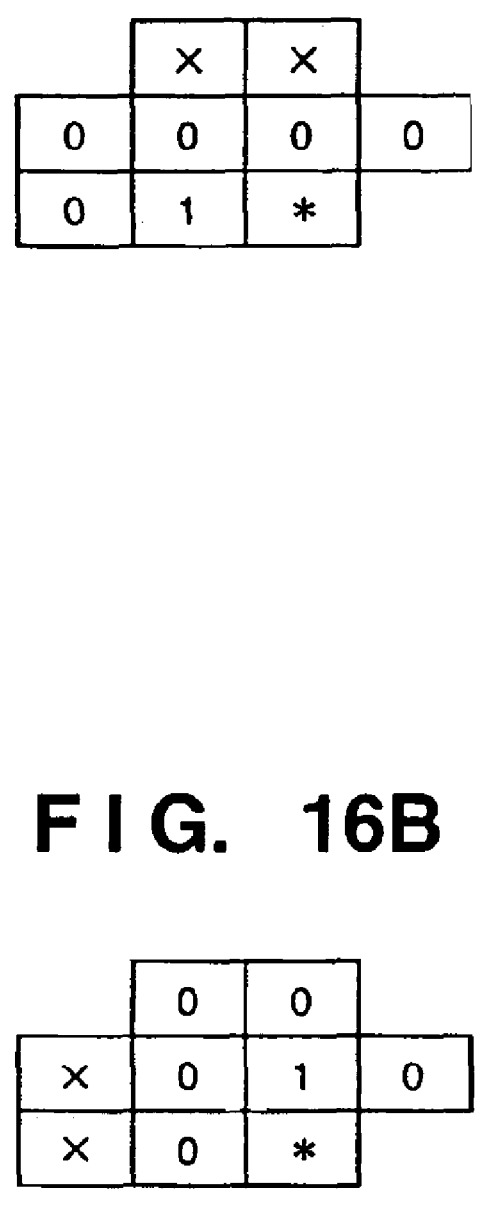

FIGS. 16A and 16B respectively show examples of patterns A and B set as the target pattern. In FIGS. 16A and 16B, pixel values "0" and "1" are quantization values, and X marks indicate pixels that can be any values. Note that the pattern examples shown in FIGS. 16A and 16b are those for the low-density range group. FIG. 16A shows an example of pattern A, i.e., the combination of the values of surrounding pixels (corresponding to the window shown in FIG. 15) around the pixel of interest, which has a pixel value sequence shown in FIG. 16A, is set as the target pattern when the additional information is "0". Likewise, FIG. 16B shows an example of pattern B, i.e., the target pattern set when the additional information is "1".

As can be seen from FIGS. 16A and 16B, pattern A is characterized by having a quantization value=1 at a pixel immediately preceding the pixel of interest in the horizontal direction, and pattern B is characterized by having a quantization value=1 at a pixel immediately preceding the pixel of interest in the vertical direction. Hence, in the fifth embodiment, if the pixel value sequence of pattern A is detected in a given block, a horizontally successive quantization pattern is formed; if that of pattern B is detected, a vertically successive quantization pattern is formed, as will be described in detail later.

Referring back to FIG. 14, all variables i, j, and a are initialized to "0" in step S506. Note that i is a variable for counting the vertical address, j is a variable for counting the horizontal address, and a is a flag indicating whether or not the quantization threshold value TH for multiplexing is set.

In step S507, the process branches depending on the value of flag a. That is, if flag a="0", since the quantization threshold value TH for multiplexing is not set yet, the flow advances to step S508. It is checked in step S508 if the value of the pixel of interest is included in the density range which is determined in step S502 and in which information is to be multiplexed. If the pixel of interest is included in that density range, the flow advances to step S509 to check if the pixel value sequence of a plurality of already binarized pixels within the window shown in FIG. 15 matches the target pattern set in step S504 or S504.

If the pixel value sequence matches the target pattern (pattern A or B), the flow advances to step S510 to set a value D in the quantization threshold value TH, and output it to the quantizer 203. Note that the value D is set at a value that forces the quantizer 203 to output the quantization output "1". In this manner, if the pixel value sequence of pattern A is detected in the block, a horizontally continuous quantization pattern is formed, and it indicates the multiplexed additional information "0". On the other hand, if the pixel value sequence of pattern B is detected, a vertically continuous quantization pattern is formed, and it indicates the multiplexed additional information "1".

On the other hand, if the pixel value sequence does not match the target pattern, a value C is set in the quantization threshold value TH and is output to the quantizer 203 in step S511. Also, if NO is determined in steps S507 and S508, the value C is set in the quantization threshold value TH in step S511. As the value C, it is a common practice to set a value that can obtain quantization values "0" and "1" on the average so as to attain normal quantization. For example, if the pixel value before quantization is expressed by 8 bits, C is "128". Of course, the value C is not limited to such specific value.

Only when the quantization threshold value TH is set at D in step S510, flag a is set at "1" in step S512 to indicate the end of threshold value setups for multiplexing in the block of interest.

Subsequently, the value of variable j is counted up in step S513 to shift the horizontal address by one column. It is checked in step S514 if variable j is smaller than w as the number of horizontal pixels of the block. If NO in step S514, since the processes have been done for w horizontal pixels, variable i for the vertical direction is counted up in step S515, and it is checked in step S516 if variable i is smaller than h as the number of vertical pixels. That is, if j<w or i<h, since pixels to be processed still remain, the flow returns to step S507 to repeat a series of processes.

As described above, the multiplexer 204 controls the quantization threshold value TH to be output to the quantizer 203 by a series of processes shown in the flow chart of FIG. 14. With this control, a 1-bit signal of additional information indicating "1" or "0" can be multiplexed in a block having a w×h pixel size of image information.

In the flow chart of FIG. 14, the quantization threshold value TH is output when it is set at either C or D for the sake of simplicity, but if cases of TH=D that embeds additional information are much fewer than those of TH=C that does not embed any additional information, it is effective to set C as a default quantization threshold value TH in the quantizer 203. That is, the multiplexer 204 generates a switching signal of the quantization threshold value TH to the quantizer 203 only for a pixel corresponding to TH=D, and the quantizer 203 quantizes using the value D as the quantization threshold value TH only when it receives the switching signal, and quantizes using the value C as the quantization threshold value TH for other pixels.

In the control of the quantization threshold value TH shown in FIG. 14, the pixel value sequence within the window does not match the target pattern, and scanning within the block may end. That is, multiplexing by changing the quantization threshold value TH may not be implemented in that block. In such case, it is preferable to use a method of implementing multiplexing by expressing additional information using a decodable combination of quantization values at the end portion of the block. Also, various methods such as a method that retries multiplexing by re-scanning pixels in the block by changing the density range in which additional information is to be multiplexed to that with the next priority, a method that selects the next block to multiplex the additional information, and the like may be used.

The method of determining w and h indicating the block size is not limited to equations (1) and (2) above. According to equations (1) and (2), a block is formed in accordance with the aspect ratio of an image. Alternatively, w and h may be set to define a block size which has a large width and small height in consideration of, e.g., scanning in the block in pseudo halftoning, or a square block may be set.

[Principle of Embedding Information]

The arrangement for implementing multiplexing in the fifth embodiment has been explained. The gist of the fifth embodiment lies in that a texture which is never generated in a pseudo halftone process is artificially generated by combining quantization values, and 1 bit of additional information is expressed by the presence/absence of that texture.

Figure 17:
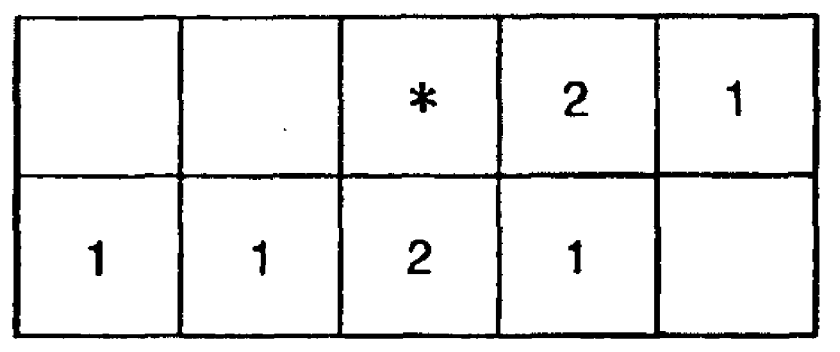

In general, error diffusion is known as a quantization method that generates a very unique texture. A serious problem of error diffusion is generation of a chain-like texture that the observer finds visually disturbing, and many proposals for preventing such disturbing texture have been made. Upon analyzing the generation factors of a texture, texture patterns include those that can be generated, and those that cannot be generated. For example, if a diffusion matrix shown in FIG. 17 is used as the error distribution table 404, when a pixel immediately before the pixel of interest indicated by * is quantized to "1", since a negative quantization error is generated, the neighboring pixel of interest is quantized to "1" less often. Therefore, upon decoding codes appended by the fifth embodiment, if a low-density range (highlight portion) can be detected to have little grayscale change, since a quantization value pattern in which both horizontally neighboring pixels assume "1" cannot be normally generated, that pattern can be recognized as a code if it is detected.

Note that a texture formed by successively printing dots hardly stands out even when it is printed by an ink-jet printer having a resolution as low as about 360 dpi on a recording sheet, and does not impose any visual disturbance. However, with a high-resolution image scanner successively printed dots can be clearly detected, and embedded additional information can be decoded.

In this manner, codes can be visually naturally embedded as long as a texture that is formed on a recording sheet can be arbitrarily controlled. This is because the frequency characteristics of error diffusion do not have any peak at a given fixed frequency but serve as a broad-band high-pass filter.

By contrast, it is difficult to arbitrarily control texture in ordered dithering in which frequency components regularly repeat themselves at short periods. Since ordered dithering has very large electric power at a fixed frequency based on the dither period, if information is embedded in a frequency range other than the peak frequency, the observer visually experiences incongruence, resulting in deterioration of image quality.

Note that a texture in the low-density range has been exemplified in the above description. Likewise, even in the middle- and high-density ranges other than the low-density range, arbitrary information can be embedded by artificially generating a texture which is never generated in the corresponding density range. That is, the decoder side need only recognize and decode a texture pattern which is never generated in a density range it can discriminate as a code.

Figure 18:
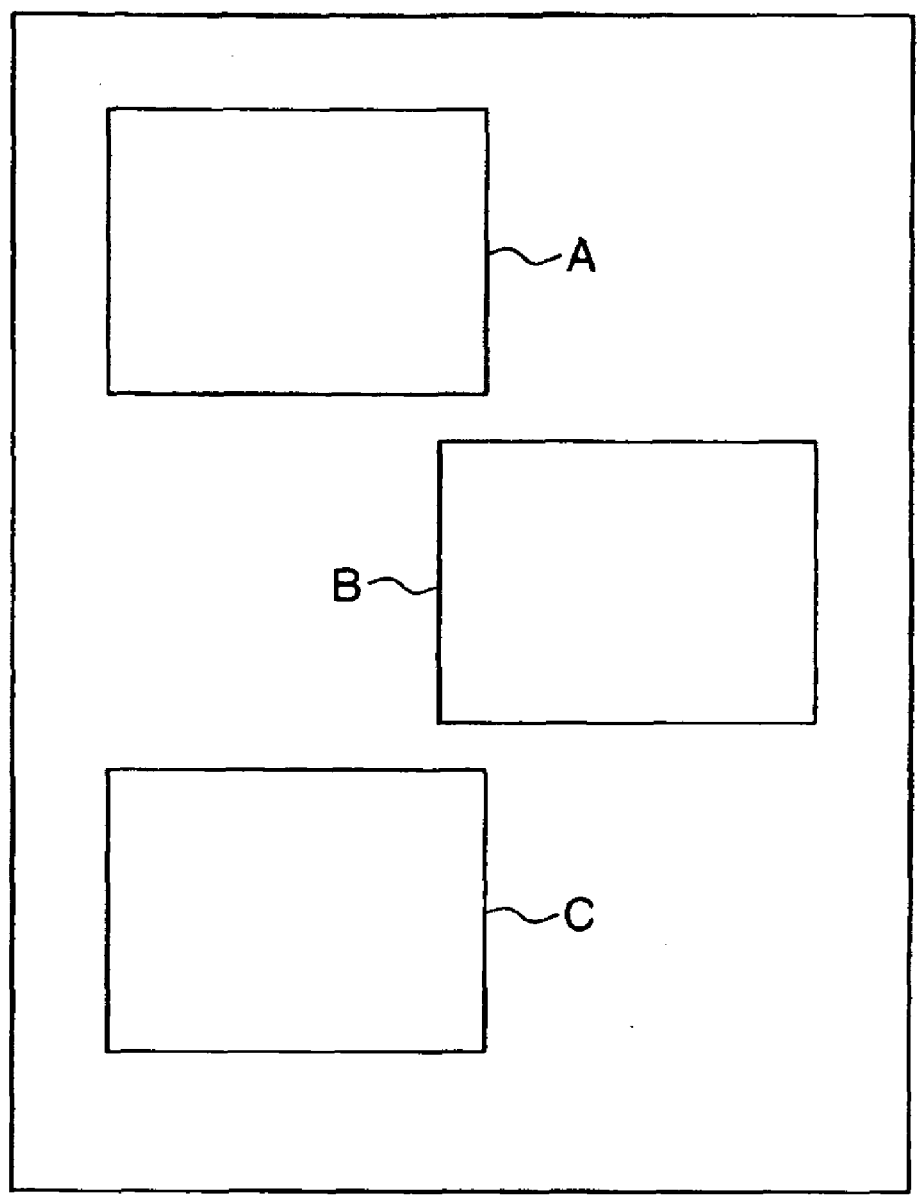
FIG. 18 shows an example of an image formed by the fifth embodiment.

An example of multiplexing additional information onto image information according to the fifth embodiment will be explained below. FIG. 18 shows an example in which three different images are output onto a recording sheet. Assume that these three different images are images A, B, and C, and have an identical image size. A case will be examined below wherein audio information that pertains to an image is to be multiplexed on each of the three different images. Note that the information sizes of audio information to be multiplexed on images A, B, and C are respectively 4 kilobytes (KB), 1 KB, and 9 KB. For the sake of simplicity, an increase in information size due to addition of header information, marker code, error correction code, or the like is ignored.

Figure 19:
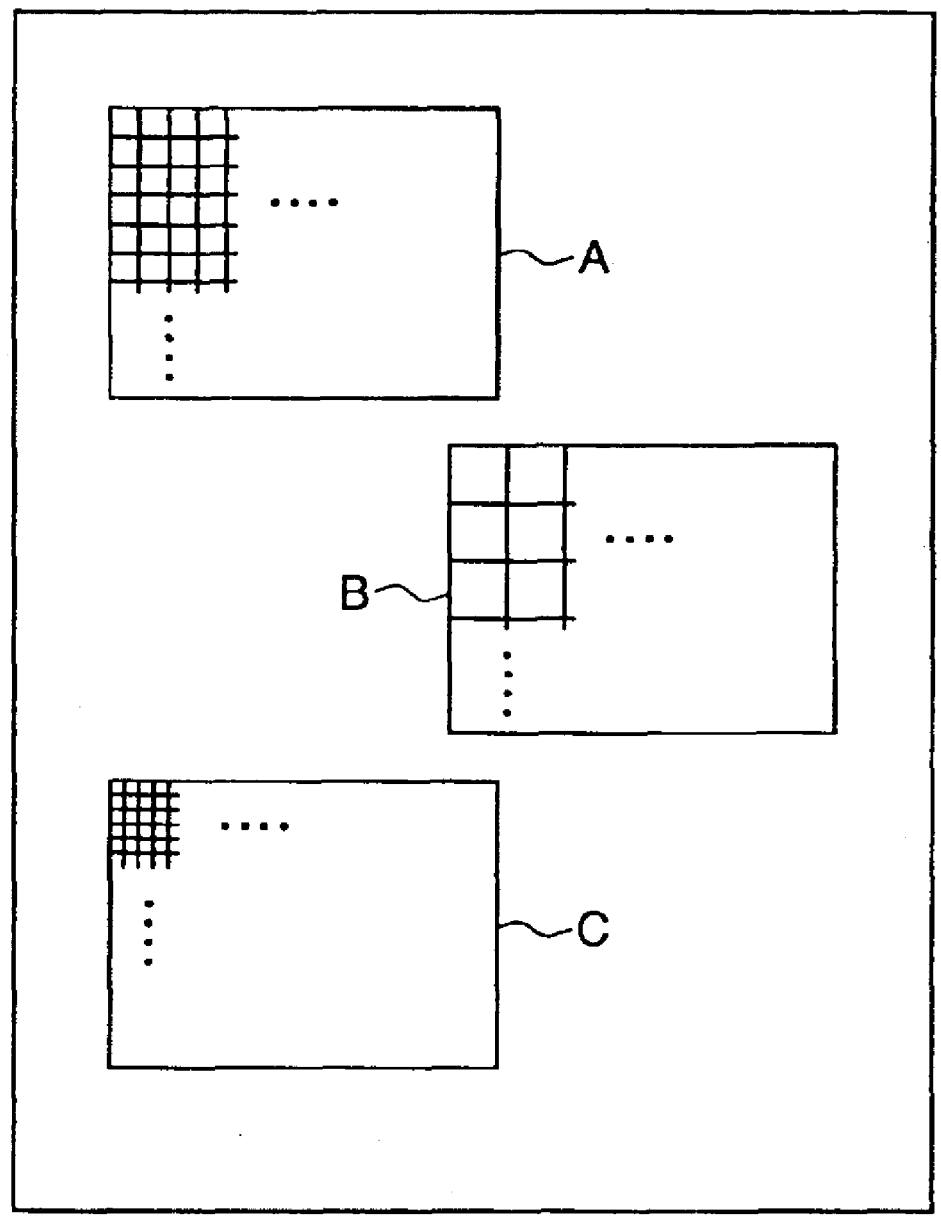
FIG. 19 shows the block segmentation processes in the formed image.

In this case, since these images have an identical image size, and the ratio A:B:C of the information sizes of audio information to be multiplexed is 4:1:9, the area ratio of blocks in each of which 1 bit of audio information is multiplexed is ¼:1:⅑. FIG. 19 shows the area ratio of blocks. A rectangular region in each image indicates one block in which 1-bit information of that image is multiplexed. Naturally, image C with the largest information size to be multiplexed has the smallest block size, and suffers the severest deterioration of image quality as a result of multiplexing information. That is, possibility of deterioration of image quality becomes higher with increasing information size to be multiplexed. For this reason, the size w×h of the multiplexing block must be limited on the basis of the value th which is experimentally obtained in advance as a limit of deterioration of image quality.

As described above, according to the fifth embodiment, since additional information is expressed by a texture that cannot be normally generated, additional information can be multiplexed onto image information in correspondence with the size of the additional information and image information size while suppressing deterioration of image quality.

Also, according to the fifth embodiment, since large-size additional information such as sound information including audio data and the like can be easily multiplexed onto image information, it is easy to distribute sound information on a recording sheet or to mix secret information in an image while minimizing deterioration of image quality.

[Sixth Embodiment]

The sixth embodiment of the present invention will be described below.

Since the arrangement of an image processing system according to the sixth embodiment is substantially the same as that shown in FIGS. 10 and 11 in the fifth embodiment, except for the operation in the multiplexing controller 201, a detailed description thereof will be omitted. A characteristic feature of the sixth embodiment lies in that additional information is multiplexed on each of four color components, i.e., yellow (Y), magenta (M), cyan (C), and black (K) as those upon image formation. Therefore, this embodiment is very effective for an apparatus that prints out a color image using the image output unit 1003.

Figure 20:
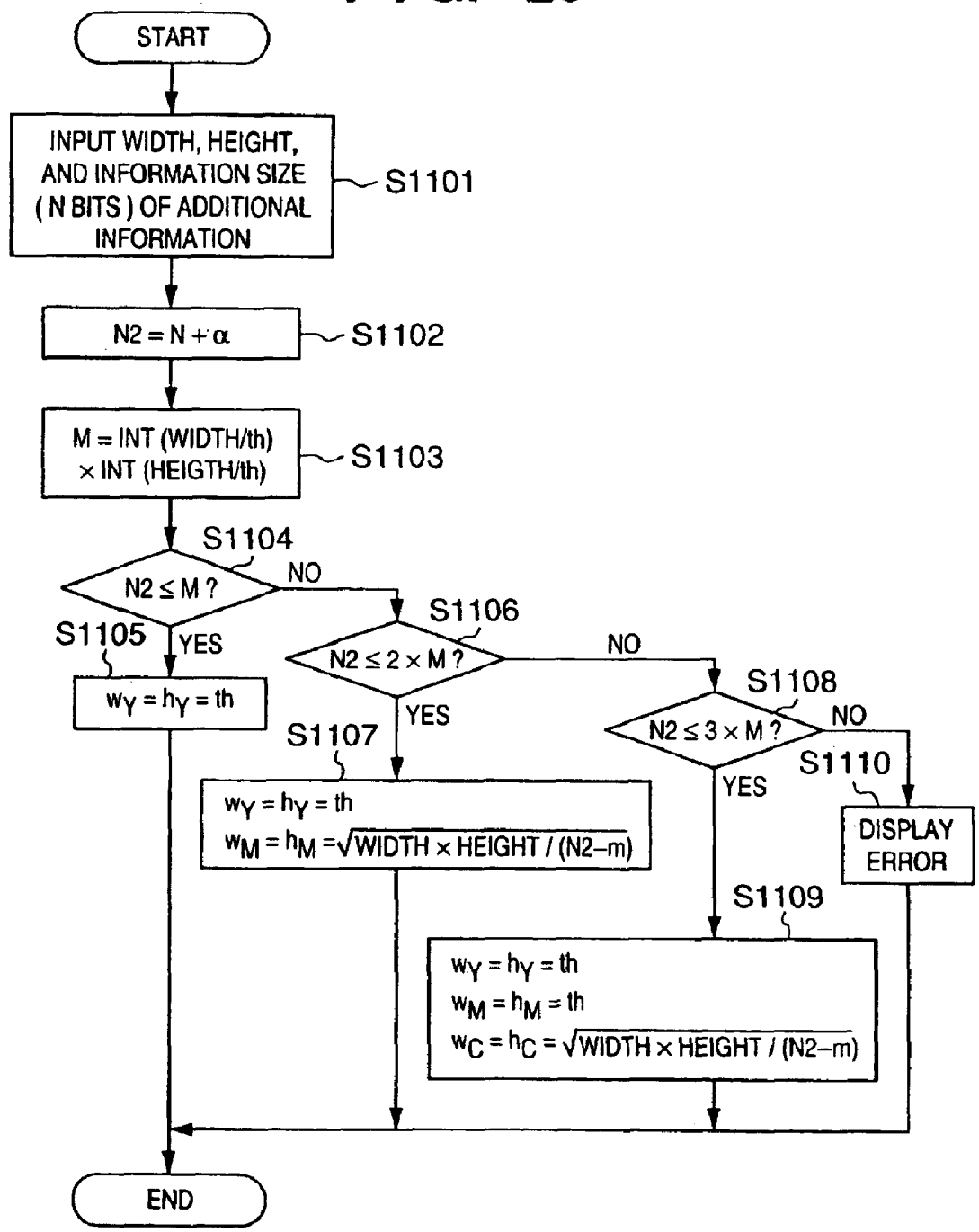
FIG. 20 is a flow chart showing the operation sequence of a multiplexing controller in the sixth embodiment of the present invention.
Figure 21:
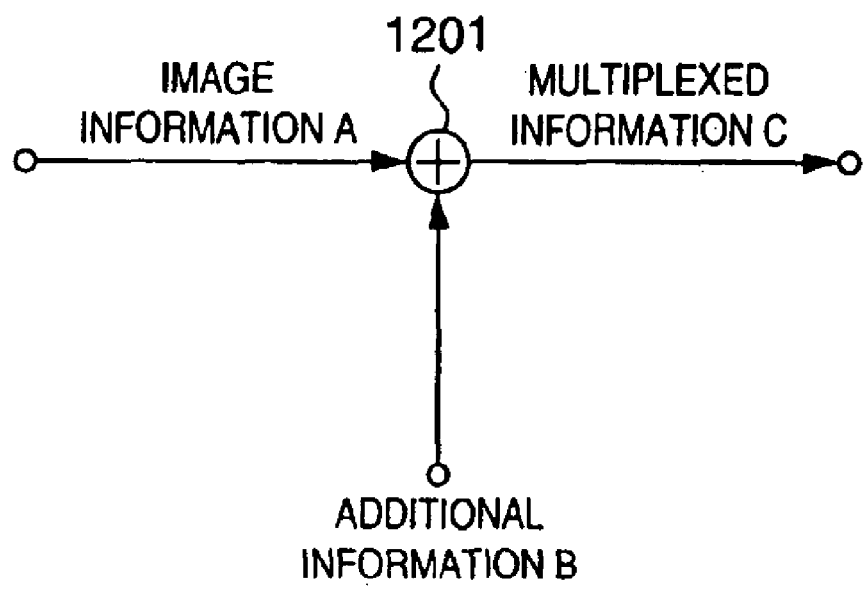
FIG. 21 is a block diagram showing an example of multiplexing.

FIG. 20 is a flow chart showing the sequence of the control process in the multiplexing controller 201 of the sixth embodiment.

In step S1101, the number HEIGHT of vertical pixels and the number WIDTH of horizontal pixels of image information, and an information size (the number of bits) N of additional information such as audio information or the like are input. In step S1102, an information size α required for multiplexing in addition to the additional information is added to N to obtain N2.

In step S1103, when lattice points are set at intervals th in image information, the number of squares bounded by these lattice point is computed by:

$$m = \text{INT}(\text{WIDTH}/th) \times \text{INT}(\text{HEIGHT}/th) \quad (3)$$

where INT indicates an integer value, with the decimal part being dropped.

m indicates the number of square blocks which have th as one side and can be arranged within an image size WIDTH× HEIGHT. Note that th may be determined by experimentally computing a limit beyond which image quality deteriorates considerably upon multiplexing additional information, or a value that makes multiplexing impossible in practice may be set. That is, m is the maximum number of blocks as a multiplexing limit, and indicates that m-bit information can be multiplexed when 1 bit is multiplexed per block.

In step S1104, the information size N2 is compared with m. If N2≦m, since multiplexing using one color component is possible, the following setup pertaining to a yellow (Y) component is made in step S1105:

$$w_Y = h_Y = th \qquad (4)$$

where $w_Y$ and $h_Y$ are respectively the numbers of horizontal and vertical pixels of a block upon multiplexing additional information onto the Y component.

On the other hand, if N2>m in step S1104, the flow advances to step S1106 to compare N2 with 2×M in turn. If N2≦2×M, since multiplexing is possible if two color components are used, the flow advances to step S1107 to make the following setup pertaining to a magenta (M) component in addition to the setup pertaining to the Y component given by equation (4):

$$w_M = h_M = \sqrt{\{WIDTH \times HEIGHT/(N2-m)\}} \qquad (5)$$

where $w_M$ and $h_M$ are respectively the numbers of horizontal and vertical pixels of a block upon multiplexing additional information onto the M component.

The process in step S1107 indicates that the remaining information size that cannot be multiplexed after a maximum number of multiplexing blocks are formed in the Y component is multiplexed on the M component. At this time, since the block size ($w_M$, $h_M$) of the M component is larger than the block size ($w_Y$, $h_Y$) used upon multiplexing information on the Y component, deterioration of image quality in the M component can be less than that in the Y component.

On the other hand, if N2>2×M in step S1106, the flow advances to step S1108 to compare N2 with 3×M in turn. If N2≦3×M, since multiplexing is possible if three color components are used, the flow advances to step S1109 to make the following setups pertaining to the M component and a C (cyan) component in addition to the setup pertaining to the Y component given by equation (4):

$$w_M = h_M = th \qquad (6)$$

$$w_C = h_C = \sqrt{\{WIDTH \times HEIGHT/(N2-2 \times m)\}} \qquad (7)$$

where $w_C$ and $h_C$ are respectively the numbers of horizontal and vertical pixels of a block upon multiplexing additional information onto the C component. Also, th is substituted in $w_M$ and $h_M$ as in $w_Y$ and $h_Y$.

The process in step S1109 indicates that multiplexing is done for both the Y and M color components up to a limit by forming minimum blocks, and the remaining information is multiplexed on the C component.

On the other hand, if N2>3×M in step S1108, an error-message is displayed in step S1110, thus ending the processing.

As described above, the sixth embodiment is characterized in that priority is assigned to color components that form an image, and multiplexing is done up to a limit of deterioration of image quality. In general, when a color image is formed using four, i.e., Y, M, C, and K components, the Y component has the lowest visual sensitivity. Although the multiplexing method in the sixth embodiment suffers little visual deterioration of image quality since it mixes information in a texture generated by error diffusion as in the fifth embodiment, it is rather preferable to multiplex information on a color agent with low sensitivity. For this reason, the sixth embodiment executes multiplexing on the Y component as the top priority, and then in the order of M and C. Of course, when the size of additional information is smaller than the image size, multiplexing can be implemented using fewer color components, but the number of color components used in multiplexing increases with increasing information size.

In the flow chart shown in FIG. 20, a multiplexing process for a K (black) component is omitted. Of course, additional information may be multiplexed on the K component. The priority order of color components is not limited to that described above. For example, higher priority can be assigned to a color agent with lower visual sensitivity such as low-density ink obtained by lowering the dye density used in, e.g., an ink-jet printer.

The sixth embodiment has exemplified a multiplexing block having the same number of vertical and horizontal pixels, but the shape of the multiplexing block is not limited to square.

As described above, according to the sixth embodiment, additional information is multiplexed on an image consisting of a plurality of color components up to a limit of deterioration of image quality in units of color component images in the predetermined priority order. Therefore, additional information having a larger size can be multiplexed on an image while minimizing deterioration of image quality.

In the fifth and sixth embodiments described above, audio information is multiplexed. However, information to be multiplexed is not limited to such specific information.

A characteristic feature of the fifth and sixth embodiments lies in that multiplexing is controlled in accordance with the size of additional information, and is not limited to the aforementioned control method. Also, as a method of multiplexing additional information by changing the texture pattern using a combination of quantization values, various methods may be used in addition to the method of changing the quantization threshold value.

Since the aforementioned multiplexing method uses a texture produced by pseudo halftoning, a plurality of pixels must be referred to even upon multiplexing 1 bit, and a change in quantization threshold value of error diffusion influences binarization results of a plurality of pixels after the pixel of interest. For this reason, as the minimum number of pixels per block, an optimal value is preferably computed by experiments so as to prevent the texture pattern from visually standing out.

In the fifth and sixth embodiments, the multiplexing conditions are controlled in accordance with additional information and image information. The multiplexing conditions are multiplexed as header information onto image information upon transmission. The reception system demultiplexes additional, information and image information on the basis of the multiplexing conditions described in the header information.

In the sixth embodiment, when the size of additional information becomes larger than a prescribed value, an error message is displayed. Alternatively, it is very effective to make hybrid control that executes another multiplexing method when the size of additional information becomes larger than the prescribed value.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for embedding information in an image, comprising:

an obtaining section, arranged to obtain distribution information of pixel values of a neighborhood of grid points of an image subjected to a pseudo halftone process, by scanning the image;

a detector, arranged to detect an information size of information that can be embedded in the image on the basis of the obtained distribution information; and an embedding section, arranged to embed the information in the image by controlling pixel values on the grid points, except for a grid point in a middle-density region of the image, which is indicated by the obtained distribution information, so that a combination of the controlled pixel values on the grid points indicates the information to be embedded.

2. The apparatus according to claim 1, further comprising a display section, arranged to display the detected information size on a monitor.

3. An image processing method for embedding information in an image, comprising the steps of:

obtaining distribution information of pixel values for a neighborhood of grid points of an image subjected to a pseudo halftone process, by scanning the image;

detecting an information size for information that can be embedded in the image on the basis of the obtained distribution information; and embedding the information in the image by controlling pixel values on the grid points, except for a grid point in a middle density region of the image, which is indicated by the obtained distribution information, so that a combination of the controlled pixel values on the grid points indicates the information to be embedded.

4. The method according to claim 3, further comprising the step of displaying the detected information size on a monitor.

5. A computer readable medium on which is stored computer program code of a method for embedding information in an image, said method comprising the steps of:

obtaining distribution information of pixel values of a neighborhood of grid points of an image subjected to a pseudo halftone process, by scanning the image;

detecting an information size for information that can be embedded in the image on the basis of the obtained distribution information; and embedding the information in the image by controlling pixel values on the grid points, except for a grid point in a middle density region of the image, which is indicated by the obtained distribution information, so that a combination of the controlled pixel values on the grid points indicates the information to be embedded.

* * * * *

UNITED STATES PATENT AND TRADEMARK OFFICE
CERTIFICATE OF CORRECTION

PATENT NO. : 6,954,542 B2  
APPLICATION NO. : 10/754524  
DATED : October 11, 2005  
INVENTOR(S) : Miyake et al.

Page 1 of 1

It is certified that error appears in the above-identified patent and that said Letters Patent is hereby corrected as shown below:

COLUMN 6:
Line 19, "conditions" should read -- condition --.

COLUMN 8:
Line 2, "methods" should read -- method --; and
Line 36, "display that pertains-information" should read -- a display that pertains to information --.

COLUMN 18:
Line 52, "point" should read -- points --.

COLUMN 19:
Line 36, "w $_{M=hM}$=th" should read -- w $_M$=h$_M$=th --.

COLUMN 20:
Line 43, "additional," should read -- additional --.

Signed and Sealed this

Nineteenth Day of December, 2006

JON W. DUDAS
*Director of the United States Patent and Trademark Office*